(12) United States Patent
Yoshida et al.

(10) Patent No.: US 7,835,609 B2
(45) Date of Patent: Nov. 16, 2010

(54) OPTICAL FIBER AND OPTICAL FIBER PREFORM

(75) Inventors: Takeshi Yoshida, Sakura (JP); Tomohiro Nunome, Sakura (JP)

(73) Assignee: Fujikura Ltd., Tokyo (JP)

( * ) Notice: Subject to any disclaimer, the term of this patent is extended or adjusted under 35 U.S.C. 154(b) by 11 days.

(21) Appl. No.: 12/441,040

(22) PCT Filed: Sep. 13, 2007

(86) PCT No.: PCT/JP2007/067830

§ 371 (c)(1),
(2), (4) Date: May 4, 2009

(87) PCT Pub. No.: WO2008/032779

PCT Pub. Date: Mar. 20, 2008

(65) Prior Publication Data

US 2009/0317040 A1 Dec. 24, 2009

(30) Foreign Application Priority Data

Sep. 14, 2006 (JP) .............................. 2006-249360

(51) Int. Cl.
*G02B 6/036* (2006.01)

(52) U.S. Cl. ...................................... 385/127; 385/126
(58) Field of Classification Search ................ 385/126, 385/127

See application file for complete search history.

(56) References Cited

U.S. PATENT DOCUMENTS 6,587,623 B1 * 7/2003 Papen et al. ................. 385/123
6,952,519 B2 * 10/2005 Bickham et al. ............. 385/127
7,082,243 B2 * 7/2006 Bickham et al. ............. 385/127
7,209,626 B2 * 4/2007 Dragic ........................ 385/142

(Continued)

FOREIGN PATENT DOCUMENTS

JP 2584151 B2 2/1997

(Continued)

OTHER PUBLICATIONS

Tomoya Shimizu et al, "A Study on Definition of the SBS Threshold in a Single-Mode Optical Fiber", Institute of Electronics, Information and Communication Engineers, General Conference, 2005, p. 356, B-10-66, IEICE, Japan.

(Continued)

*Primary Examiner*—Rhonda S Peace
(74) *Attorney, Agent, or Firm*—Sughrue Mion, PLLC

(57) ABSTRACT

An optical fiber is constituted by: a three-layer structured core which includes, a first core (having a relative refractive index difference of $\Delta 1$ in a region of a radius of R1), a second core (having a relative refractive index difference of $\Delta 2$ in a region from the radius R1 to a radius of R2), and a third core (having a relative refractive index difference of $\Delta 3$ in a region from the radius of R2 to a radius of R3), wherein the relative refractive index differences have relationships of $\Delta 1 > \Delta 2$, $\Delta 3 > \Delta 2$, and $\Delta 3 > \Delta 1$, when $\Delta 1 - \Delta 2 = X$ and $\Delta 3 - \Delta 2 = Y$, $(X+Y) > 0.4\%$ is satisfied, and X and Y satisfy $0.25\% < X < 0.6\%$, $0.1\% \leq Y \leq 0.6\%$, and a relationship of $(2*X-0.7)\% < Y < (X/2+0.4)\%$, thereby satisfying the G652 standard and having an SBS threshold equal to or higher than that of an optical fiber having the same MFD by +3 dB or higher.

4 Claims, 11 Drawing Sheets

U.S. PATENT DOCUMENTS

2006/0171648 A1   8/2006   Hasegawa

FOREIGN PATENT DOCUMENTS

| JP | 2006-133314 A | 5/2006 |
| JP | 2006-154707 A | 6/2006 |
| JP | 2006-154713 A | 6/2006 |
| JP | 2006-184534 A | 7/2006 |
| JP | 2006-232599 A | 9/2006 |
| RU | 2168190 C2 | 1/1999 |
| WO | 2004/100406 A2 | 11/2004 |

OTHER PUBLICATIONS

Kobyakov et al.; Design Concept for optical fibers with enhanced SBS threshold; Optics Express (2005); pp. 5338-5346; vol. 13 No. 14.

Bickham et al.; Nonlinear Optical Fibers with Increased SBS Thresholds; Optical Society of America (2006).

Satou, F., et al., "Transmission Properties of SBS-Suppressed Fiber," IEICE Communications Society Conference, Sep. 7, 2005, pp. 293, No. 2.

* cited by examiner

SBS THRESHOLD MEASUREMENT SYSTEM

RELATIONSHIP BETWEEN $\Delta 2 + \Delta 3$ AND
$R2/R1$ SATISFYING MFD=7.9 TO 10.2 μm

OPTICAL FIBER AND OPTICAL FIBER PREFORM

CROSS REFERENCE TO RELATED APPLICATIONS

This is a National Stage of International Application No. PCT/JP2007/067830 filed Sep. 13, 2007, claiming priority based on Japanese Patent Application No. 2006-249360, filed Sep. 14, 2006, the contents of all of which are incorporated herein by reference in their entirety.

TECHNICAL FIELD

The present invention relates to an optical fiber and an optical fiber preform. There was a problem in that when an optical analog signal or an optical baseband signal is transmitted for a long distance by using an optical fiber, due to an effect of stimulated Brillouin scattering (hereinafter, referred to as SBS), only a predetermined intensity of light (SBS threshold power) can be transmitted through the optical fiber although light with higher power was intended to be transmitted, and the remaining light becomes backscattered light and returns to the incoming side, so that transmissible power of signal light is limited. The invention relates to an optical fiber capable of suppressing occurrences of SBS and transmitting higher power of signal light.

BACKGROUND ART

Recently, fiber to the home (FTTH) services in which homes are connected via optical fibers to exchange information using the optical fibers have been expanded. In FTTH services for transmitting various types of information, there is a system for simultaneously transmitting a broadcasting signal and other communications signals in their respective modes using a single optical fiber. In general, in this system, in many cases, the broadcasting signal is an analog signal, a baseband signal, or an optical SCM signal. The characteristics of this system from the point of optical fiber as a transmission medium are as follows:

(i) FTTH is based on a typical double-star PON (passive optical network), and a distribution loss increases.

(ii) In order to transmit an analog signal, a baseband signal, or an optical SCM signal, a receiver needs a high CNR (carrier-to-noise ratio), so that the minimum signal light power of a light receiving unit needs to be greater than that in digital transmission used for communications.

As described above, when analog transmission using intensity modulation is performed for video transmission, high power transmission is needed to compensate for a distribution loss and guarantee a high CNR. However, there was a problem in that only a predetermined intensity of light (SBS threshold power) can be transmitted through the optical fiber although higher power is intended to be transmitted, and the remaining light becomes backscattered light and returns to the incident side, so that transmissible signal light power was limited.

As means for suppressing SBS, there is a technique for changing a dopant concentration and a residual stress in a longitudinal direction (for example, see Patent Document 1). In this technique, by changing the dopant concentration or the residual stress in the longitudinal direction, it is possible to enlarge the Brillouin spectrum and suppress occurrences of SBS. In addition, techniques for giving such a refractive index profile for an optical fiber that SBS can be suppressed, are proposed (for example, see Patent Documents 2 to 5, and 7).

Patent Document 1: Japanese Patent No. 2584151
Patent Document 2: WO 2004/1100406
Patent Document 3: U.S. Pat. No. 7,082,243
Patent Document 4: Japanese Unexamined Patent Application Publication No. 2006-154707
Patent Document 5: Japanese Unexamined Patent Application Publication No. 2006-184534
Patent Document 6: Japanese Unexamined Patent Application Publication No. 2006-133314
Patent Document 7: Japanese Unexamined Patent Application Publication No. 2006-154713
Non-Patent Document 1: "Design concept for optical fibers with enhanced SBS threshold" Optics Express, Vol. 13, Issue 14, p. 5338 (July 2005), Andrey
Non-Patent Document 2: "Nonlinear Optical Fibers with Increased SBS Thresholds" OFCINFOEC 2006, OTuA3, Scott Bickham, Andrey Kobyakov, Shenping Li.

DISCLOSURE OF THE INVENTION

Problems that the Invention is to Solve

As a technique for suppressing SBS, as described above, the technique for changing a dopant concentration or a residual stress in a longitudinal direction is reported (Patent Document 1). However, in this technique, optical characteristics are changed in the longitudinal, so that this technique is not preferable for practical use.

In addition, techniques for suppressing SBS by giving a refractive index profile for an optical fiber (Patent Documents 2 to 5 and 7) are reported. In theses techniques, a change in optical characteristics in a longitudinal direction does not occur. However, a structure having a refractive index profile suitable for desired characteristics is needed.

In Patent Documents 2, 3, and 5, for an optical fiber described which has a three-layer structured refractive index profile, the refractive index profile is set to a suitable condition, thereby suppressing SBS and obtaining the same optical characteristics as ITU-T Recommendation G.652 hereinafter, referred to as G652). However, not all structures described in Patent Documents 2, 3, and 5 satisfy the same optical characteristics as G652, and when manufacturing is practically performed on the basis of these conditions, a suitable design value for each condition is needed.

In Patent Document 4, a uniform bending loss becomes worse, and in consideration of handling of the optical fiber, this phenomenon is not preferable.

In Patent Document 6, fluorine needs to be added at an intentional position, so that manufacturing a preform using a VAD method is difficult.

In Patent Document 7, only the shape of a refractive index profile is described, and detailed parameters and the like are not mentioned.

Means for Solving the Problems

The invention is designed to solve the above-mentioned problems. An object of the invention is to provide an optical fiber and an optical fiber preform which have stable characteristics in a longitudinal direction, compatibility with G652, excellent manufacturability, and suppressed SBS, by giving a structure design value for a suitable refractive index profile.

According to a first aspect of the invention, there is provided an optical fiber having a refractive index profile constituted by: a three-layer structured core which includes, in the central portion of the core, a first core having a substantially uniform positive relative refractive index difference $\Delta 1$ in a region from the center of the core to a radius of R1 μm, a second core which surrounds and comes in contact with the first core and has a substantially uniform positive relative refractive index difference Δ2 in a region from the radius of R1 μm to a radius of R2 μm, and a third core which surrounds and comes in contact with the second core and has a substantially uniform positive, relative refractive index difference Δ3 in a region from the radius of R2 μm to a radius of R3 μm; and a cladding which surrounds and comes in contact with the three-layer structured core and has a substantially uniform refractive index, wherein Δ2 is equal to or less than 0.4%, Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, and X and Y satisfy 0.25%<X<0.6%, 0.1%≦Y≦0.6%, and a relationship of (2*X−0.7)%<Y<(X/2+0.4)%, Δ2, Δ3, R1, and R2 satisfy relationships of (Δ2+Δ3)+1.0≦R2/R1≦7*(Δ2+Δ3)−1.45 and Δ2+Δ3≦1.15, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm²·km), a uniform bending loss is equal to or less than 2 dB/m at a diameter of 20 mm and a wavelength of 1.31 μm, and an SBS threshold at a wavelength of 1.55 μm is higher than that of a single-mode optical fiber having a typical step-index profile and the same mode field diameter by +3 dB or higher.

According to a second aspect of the invention, there is provided an optical fiber having a refractive index profile constituted by: a three-layer structured core which includes, in the central portion of the core, a first core having a maximum relative refractive index difference Δ1 in a region from the center of the core to a radius of R1 μm, a second core which surrounds and comes in contact with the first core and has a minimum relative refractive index difference Δ2 in a region from the radius of R1 μm to a radius of R2 μm, and a third core which surrounds and comes in contact with the second core and has a maximum relative refractive index difference Δ3 in a region from the radius of R2 μm to a radius of R3 μm; and a cladding which surrounds and comes in contact with the three-layer structured core and has a substantially uniform refractive index, wherein Δ2 is equal to or less than 0.4%, Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, X and Y satisfy 0.25%<X<0.6%, 0.1%≦Y≦0.6%, and a relationship of (2*X−0.7)%<Y<(X/2+0.4)%, the Δ2, Δ3, R1, and R2 satisfy relationships of (Δ2+Δ3)+1.0≦R2/R1≦7*(Δ2+Δ3)−1.45 and Δ2+Δ3≦1.15, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm²·km), a uniform bending loss is equal to or less than 2 dB/m at a diameter of 20 mm and a wavelength of 1.31 μm, and an SBS threshold at a wavelength of 1.55 μm is higher than that of a single-mode optical fiber having a typical step-index profile and the same mode field diameter by +3 dB or higher.

According to a third aspect of the invention, there is provided an optical fiber preform having a refractive index profile constituted by: a three-layer structured core which includes, in the central portion of the core, a first core having a substantially uniform positive relative refractive index difference Δ1 in a region from the center of the core to a radius of R1 μm, a second core which surrounds and comes in contact with the first core and has a substantially uniform positive relative refractive index difference Δ2 in a region from the radius of R1 μm to a radius of R2 μm, and a third core which surrounds and comes in contact with the second core and has a substantially uniform positive relative refractive index difference Δ3 in a region from the radius of R2 μm to a radius of R3 μm; and a cladding which surrounds and comes in contact with the three-layer structured core and has a substantially uniform refractive index, wherein Δ2 is equal to or less than 0.4%, the Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, and X and Y satisfy 0.25%<X<0.6%, 0.1%≦Y≦0.6%, and a relationship of (2*X−0.7)%<Y<(X/2+0.4)%, Δ2, Δ3, R1, and R2 satisfy relationships of (Δ2+Δ3)+1.0≦R2/R1≦7*(Δ2+Δ3)−1.45 and Δ2+Δ3≦1.15, and when the optic preform is drawn into an optical fiber, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm²·km), a uniform bending loss is equal to or less than 2 dB/m at a diameter of 20 mm and a wavelength of 1.31 μm, and an SBS threshold at a wavelength of 1.55 μm is higher than that of a single-mode optical fiber having a typical step-index profile and the same mode field diameter by +3 dB or higher.

According to a fourth aspect of the invention, there is provided an optical fiber preform having a refractive index profile constituted by: a three-layer structured core which includes, in the central portion of the core, a first core having a maximum relative refractive index difference Δ1 in a region from the center of the core to a radius of R1 μm, a second core which surrounds and comes in contact with the first core and has a minimum relative refractive index difference Δ2 in a region from the radius of R1 μm to a radius of R2 μm, and a third core which surrounds and comes in contact with the second core and has a maximum relative refractive index difference Δ3 in a region from the radius of R2 μm to a radius of R3 μm; and a cladding which surrounds and comes in contact with the three-layer structured core and has a substantially uniform refractive index, wherein Δ2 is equal to or less than 0.4%, Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, and X and Y satisfy 0.25%<X<0.6%, 0.1%≦Y≦0.6%, and a relationship of (2*X−0.7)%<Y<(X/2+0.4)%, Δ2, Δ3, R1, and R2 satisfy relationships of (Δ2+Δ3)+1.0≦R2/R1≦7*(Δ2+Δ3)−1.45 and Δ2+Δ3≦1.15, a when the optical fiber preform is drawn into an optical fiber, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm²·km), a uniform bending loss is equal to or less than 2 dB/m at a diameter of 20 mm and a wavelength of 1.31 μm, and an SBS threshold at a wavelength of 1.55 μm is higher than that of a single-mode optical fiber having a typical step-index profile and the same mode field diameter by +3 dB or higher.

DESCRIPTION OF SYMBOLS

Figure 1:
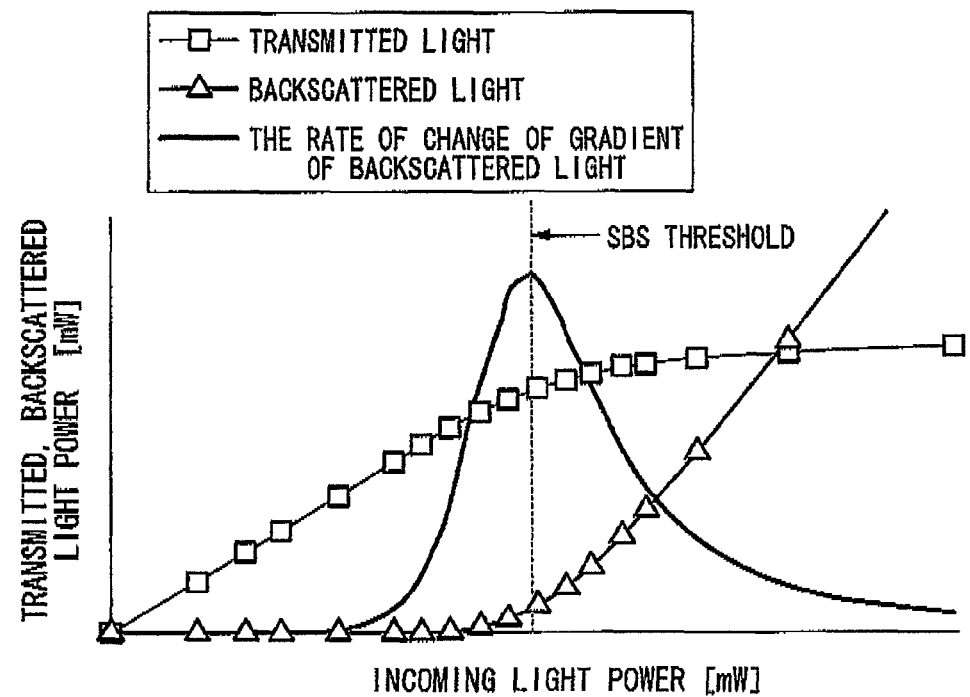
FIG. 1 is a view showing a relationship between incoming light power and transmitted, backscattered light power to show occurrences of SBS.

1: LIGHT SOURCE AT WAVELENGTH OF 1.32 μm
2: LIGHT SOURCE AT WAVELENGTH OF 1.55 μm
3: EDFA
4: POWER METER FOR MEASURING BACKSCATTERED LIGHT POWER
5: 9:1 COUPLER
6: POWER METER FOR MEASURING INCOMING LIGHT POWER
7: POWER METER FOR MEASURING TRANSMITTED LIGHT POWER
8: OPTICAL FIBER TO BE MEASURED

BEST MODE FOR CARRYING OUT THE INVENTION

An optical fiber of the invention has a refractive index profile constituted by: a three-layer structured core which includes, in the central portion of the core, a first core having a substantially uniform positive relative refractive index difference $\Delta 1$ in a region from the center of the core to a radius of R1 μm, a second core which surrounds and comes in contact with the first core and has a substantially uniform positive relative refractive index difference $\Delta 2$ in a region from the radius of R1 μm to a radius of R2 μm, and a third core which surrounds and comes in contact with the second core and has a substantially uniform positive relative refractive index difference $\Delta 3$ in a region from the radius of R2 μm to a radius of R3 μm; and a cladding which surrounds and comes in contact with the three-layer structured core and has a substantially uniform refractive index, or has a refractive index profile constituted by: a three-layer structured core which includes, in the central portion of the core, a first core having a maximum relative refractive index difference $\Delta 1$ in a region from the center of the core to a radius of R1 μm, a second core which surrounds and comes in contact with the first core and has a minimum relative refractive index difference $\Delta 2$ in a region from the radius of R1 μm to a radius of R2 μm, and a third core which surrounds and comes in contact with the second core and has a maximum relative refractive index difference $\Delta 3$ in a region from the radius of R2 μm to a radius of R3 μm; and a cladding which surrounds and comes in contact with the three-layer structured core and has a substantially uniform refractive index.

In the optical fiber, $\Delta 2$ is equal to or less than 0.4%, $\Delta 1$, $\Delta 2$, and $\Delta 3$ have relationships of $\Delta 1 > \Delta 2$, $\Delta 3 > \Delta 2$, and $\Delta 3 > \Delta 1$, when $\Delta 1$, $\Delta 2$, and $\Delta 3$ have relationships of $\Delta 1 - \Delta 2 = X$ and $\Delta 3 - \Delta 2 = Y$, (X+Y)>0.4% is satisfied, and X and Y satisfy 0.25%<X<0.6%, 0.1%≦Y≦0.6%, and a relationship of (2*X−0.7)%<Y<(X/2+0.4)%, $\Delta 2$, $\Delta 3$, R1, an R2 satisfy relationships of $(\Delta 2+\Delta 3)+1.0 \leq R2/R1 \leq 7*(\Delta 2+\Delta 3)-1.45$ and $\Delta 2+\Delta 3 \leq 1.15$, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm²·km), a uniform beading loss is equal to or less than 2 dB/m at a diameter of 20 mm and a wavelength of 1.31 μm, and an SBS threshold at a wavelength of 1.55 μM is higher than that of a single-mode optical fiber having a typical step-index profile and the same mode field diameter by +3 dB or higher.

In addition, the optical fiber of the invention may be manufactured by drawing a preform manufactured by a typical VAD method. However, the manufacturing method of the preform is not limited to the VAD method, and well-known OVD and CVD methods can be used.

FIG. 1 is a graph showing occurrences of SBS in an optical fiber. As shown in FIG. 1, when the power of light entering the optical fiber is gradually increased, at a specific value, the power of backscattered light sharply increases, and most of the power of the incoming light becomes backscattered light and returns to the incoming side. Therefore, as shown in FIG. 1, incoming light power at the maximum change rate (second-order differential equation of backscattered light) of a gradient of the backscattered light with respect to a change in the incoming light power is defined as a threshold (SBS threshold) of an occurrence of SBS.

Figure 2:
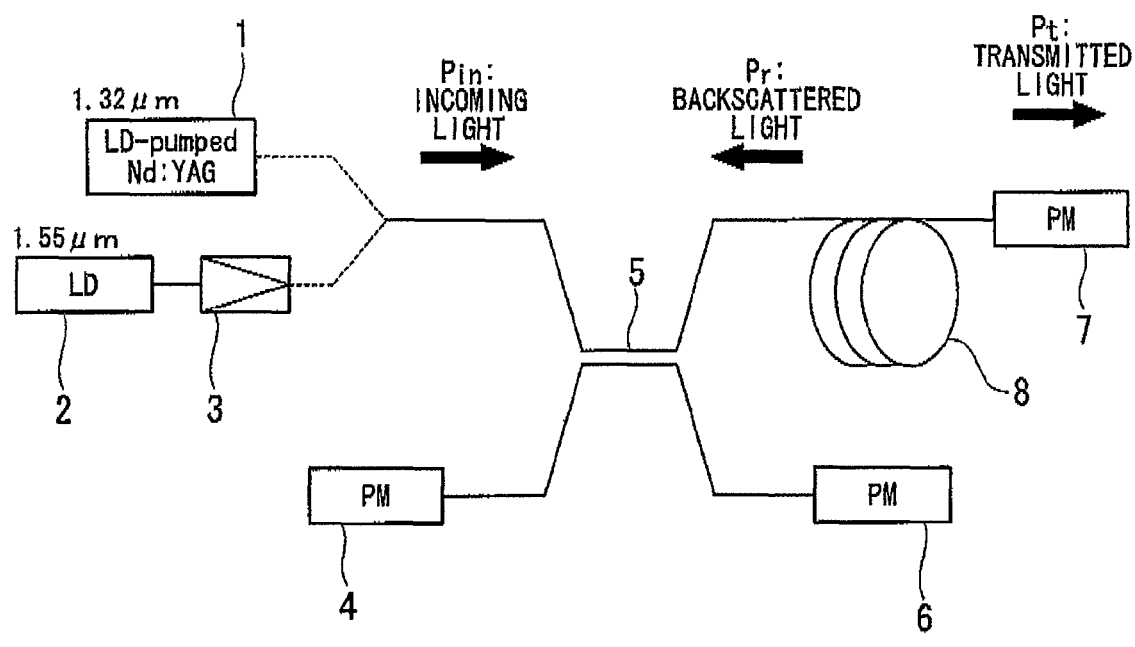
FIG. 2 is a view illustrating a configuration of an SBS threshold measurement system.

FIG. 2 is a view illustrating a configuration of an SBS threshold measurement system. In FIG. 2, reference numeral 1 denotes a light source at a wavelength of 1.32 μm, reference numeral 2 denotes a light source at a wavelength of 1.55 μm, reference numeral 3 denotes an EDFA, reference numeral 4 denotes a power meter for measuring backscattered light power, reference numeral 5 denotes a 9:1 coupler, reference numeral 6 denotes a power meter for measuring incoming light power, reference numeral 7 denotes a power meter for measuring transmitted light power, and a reference numeral 8 denotes an optical fiber to be measured. In this measurement system, the three power meters 4, 6, and 7 are connected through the 9:1 coupler 5 to measure the power of incoming light, backscattered light, and transmitted light of the optical fiber 8 to be measured. In addition, incoming light power at the maximum second-order differential equation of the backscattered light with respect to the incoming light becomes an SBS threshold.

In Patent Documents 2 and 3, an SBS threshold is evaluated by using the same measurement system and definition. Here, the definition of the SBS threshold is considered as definition 4 in the following document.

Shimizu, "A Study on Definition of the SBS Threshold in a Single-Mode Optical Fiber", Institute of Electronics, Information and Communication Engineers, General Conference in 2005, B-10-66.

Figure 3:
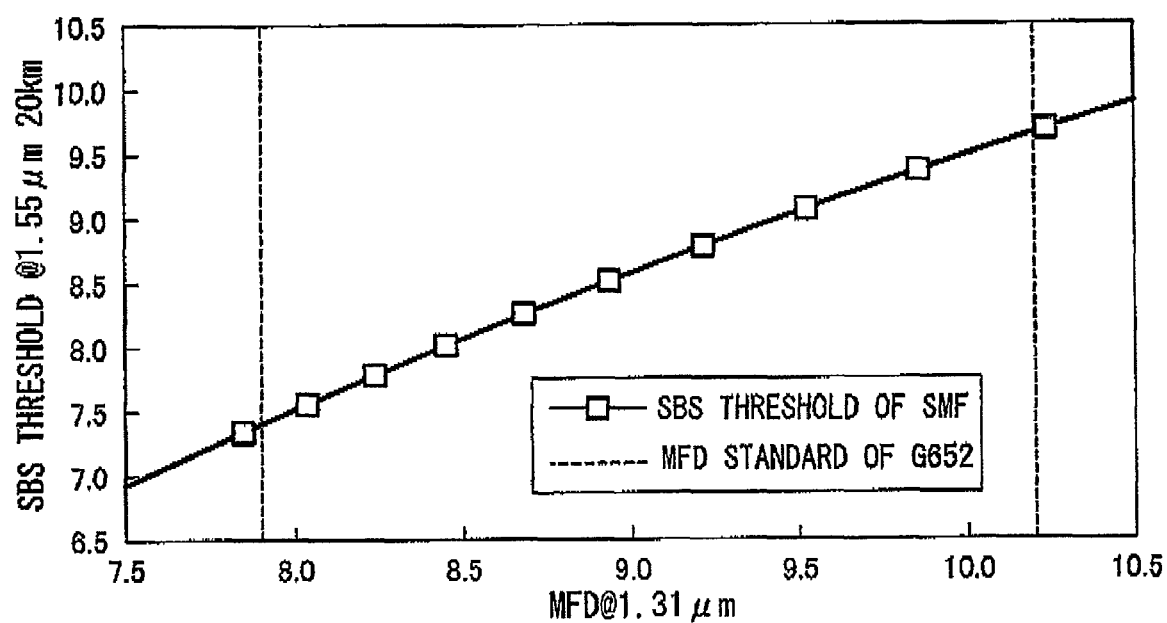
FIG. 3 is a view showing MUD dependence of an SBS threshold of an SMF having a refractive index profile of step-index model illustrated in FIG. 4.
Figure 4:
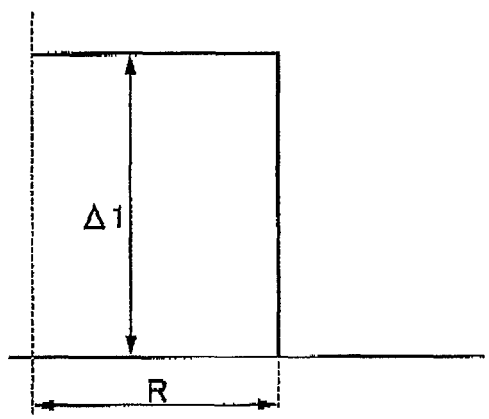
FIG. 4 is a view showing the refractive index profile of step-index model.

The SBS threshold is dependent on a mode field diameter (hereinafter, referred to as MFD). A plot result obtained by calculating the MFD dependence of the SBS threshold of a single-mode optical fiber (hereinafter, referred to as SMF) which has a typical refractive index profile of step-index model as shown in FIG. 4 and satisfies the G652 standard is shown in FIG. 3. As shown in FIG. 3, in the range of 7.9 to 10.2 μm of an MFD at a wavelength of 1.31 μm that is in the G652 standard, the SBS threshold of the SMF changes in the range of 7.4 to 9.7 dBm. Accordingly, when the SBS threshold is compared, an optical fiber having the same MFD needs to be compared.

The optical fiber of the invention has optical characteristics described in G652 in that a cable cutoff wavelength is less than 1260 nm, an MFD at a wavelength of 1.31 μm is in the range of 7.9 to 10.2 μm, a zero-dispersion wavelength is in the range of 1300 to 1324 nm, a zero-dispersion slope is equal to or less than 0.093 ps/(nm$^2$·km), a uniform bending loss is equal to or less than 2 dB/m at a bending diameter of 20 mm and a wavelength of 1.31 μm, and an SBS threshold is equal to or higher than two times (+3 dB) that of an SMF having the same MFD.

Figure 5:
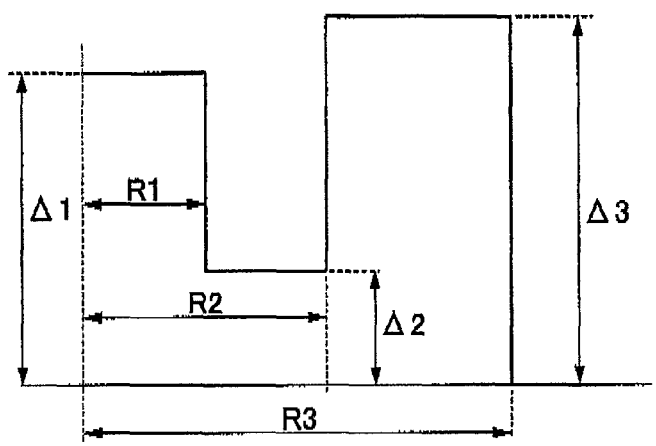
FIG. 5 is a view showing a first example of a refractive index profile of an optical fiber related to the invention.

FIG. 5 is a view illustrating a first example of a refractive index profile of the optical fiber of the invention. The refractive index profile is constituted by: a three-layer structured core which includes, in the central portion of the core, a first core having a substantially uniform positive relative refractive index difference $\Delta 1$ in a region from the center of the core to a radius of R1 μm, a second core which surrounds and comes in contact with the first core and has a substantially uniform positive relative refractive index difference $\Delta 2$ in a region from the radius of R1 μm to a radius of R2 μm, and a third core which surrounds and comes in contact with the second core and has a substantially uniform positive relative refractive index difference $\Delta 3$ in a region from the radius of R2 μm to a radius of R3 μm; and a cladding which surrounds and comes in contact with the three-layer structured core and has a substantially uniform refractive index, wherein $\Delta 1 > \Delta 2$ and $\Delta 3 > \Delta 2$.

Figure 6:
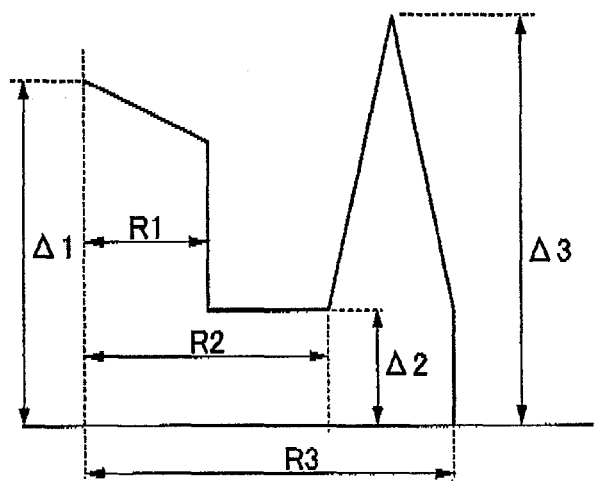
FIG. 6 is a view showing a second example of a refractive index profile of an optical fiber related to the invention.

The refractive index profile of the optical fiber of the invention, as illustrated in FIG. 6, may allow relative refractive index differences not to have uniform values. FIG. 6 is a view illustrating a second example of a refractive index profile of the optical fiber of the invention. The refractive index profile is constituted by: a three-layer structured core which includes, in the central portion of the core, a first core having a maximum relative refractive index difference $\Delta 1$ in a region from the center of the core to a radius of R1 μm, a second core which surrounds and comes in contact with the first core and has a minimum relative refractive index difference $\Delta 2$ in a region from the radius of R1 μm to a radius of R2 μm, and a third core which surrounds and comes in contact with the second core and has a maximum relative refractive index difference $\Delta 3$ in a region from the radius of R2 μm to a radius of R3 μm; and a cladding which surrounds and comes in contact with the three-layer structured core and has a substantially uniform refractive index, wherein $\Delta 1 > \Delta 2$ and $\Delta 3 > \Delta 2$.

For the optical fiber having the refractive index profile constituted by the three-layer structured core and the one-layer structured cladding for surrounding the core, in order to obtain an optical fiber which has the above-mentioned optical characteristics, that is, characteristics compatible with G652 and an SBS threshold equal to or higher than two times that of (by +3 db) the SMF having the same MFD as the optical fiber of the invention, detailed examinations were repeated. As a result, it was found that relationships between $\Delta 1$, $\Delta 2$, $\Delta 3$, R1, R2, and R3 were limited.

Figure 7:
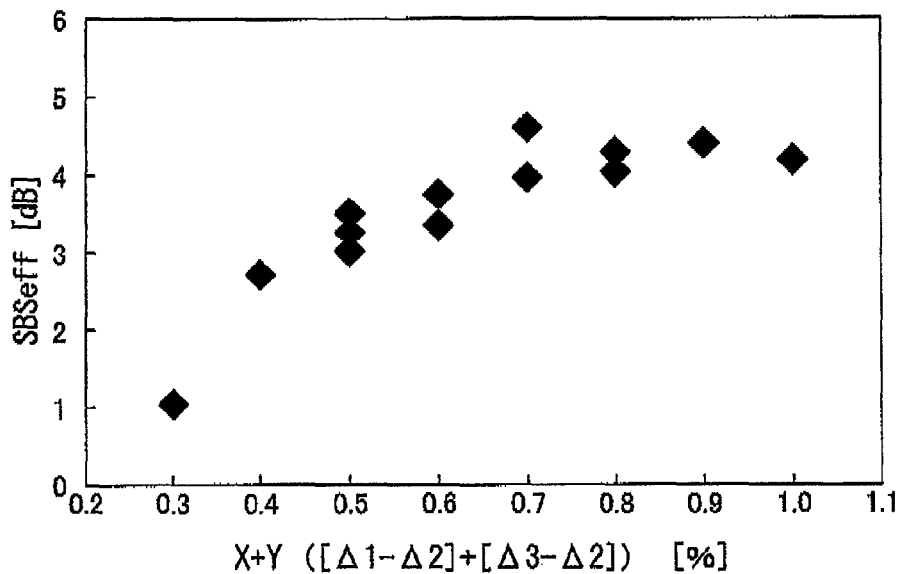
FIG. 7 is a view showing a relationship between X+Y and an SBS suppression effect (SBSeff) on an SMF having the same MFD when $\Delta 1 - \Delta 2 = X$ AND $\Delta 3 - \Delta 2 = Y$.

FIG. 7 is a view showing a relationship of a SBS suppression effect SBSeff on an SMF when $\Delta 1 - \Delta 2 = X$ and $\Delta 3 - \Delta 2 = Y$. Here, SBSeff is defined by the following expression.

SBSeff=SBS threshold of the optical fiber of the invention−SBS threshold of the SMF having the same MFD as the optical fiber of the invention As can be seen from FIG. 7, by allowing X+Y to be greater than 0.4%, it is possible to improve SBSeff to be equal to or higher than +3 dB and increase the SBS threshold. However, by only using the condition, in some cases, an optical fiber having the optical characteristics compatible with the G652 cannot be obtained.

Figure 8:
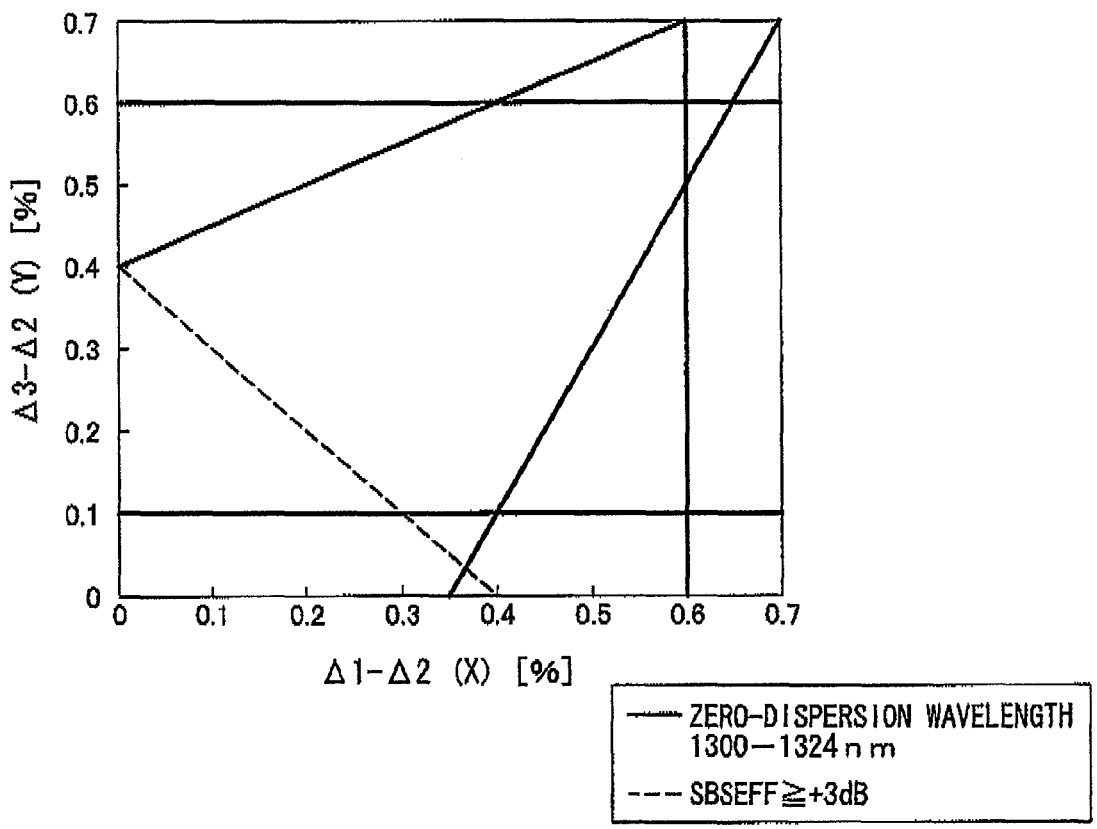
FIG. 8 is a view showing a relationship of (X,Y) satisfying a zero-dispersion wavelength of 1300 to 1324 nm and SBSeff≧+3 dB.

Specifically, in order to obtain an optical fiber having a zero-dispersion wavelength in the range of 1300 to 1324 nm, it is preferable that X and Y have relationships of X<0.6%, 0.1%≦Y≦0.6%, and (2*X−0.7)%<Y<(X/2+0.4)%. The relationships of X and Y satisfying this condition are shown in FIG. 8.

In addition, in order to allow the MFD at the wavelength of 1.31 μm to be 7.9 μm, that is, the lower limit of the G652 standard, or greater, while the condition is satisfied, it is preferable that $\Delta 2$ be equal to or less than 0.4%. In addition, in order to allow the MFD at the wavelength of 1.31 μm to be in the range of 7.9 to 10.2 μm, the position of the third core in the radial direction represented as R2/R1 needs to be suitably determined depending on the sum of $\Delta 2$ and $\Delta 3$, that is, $\Delta 2 + \Delta 3$.

Figure 9:
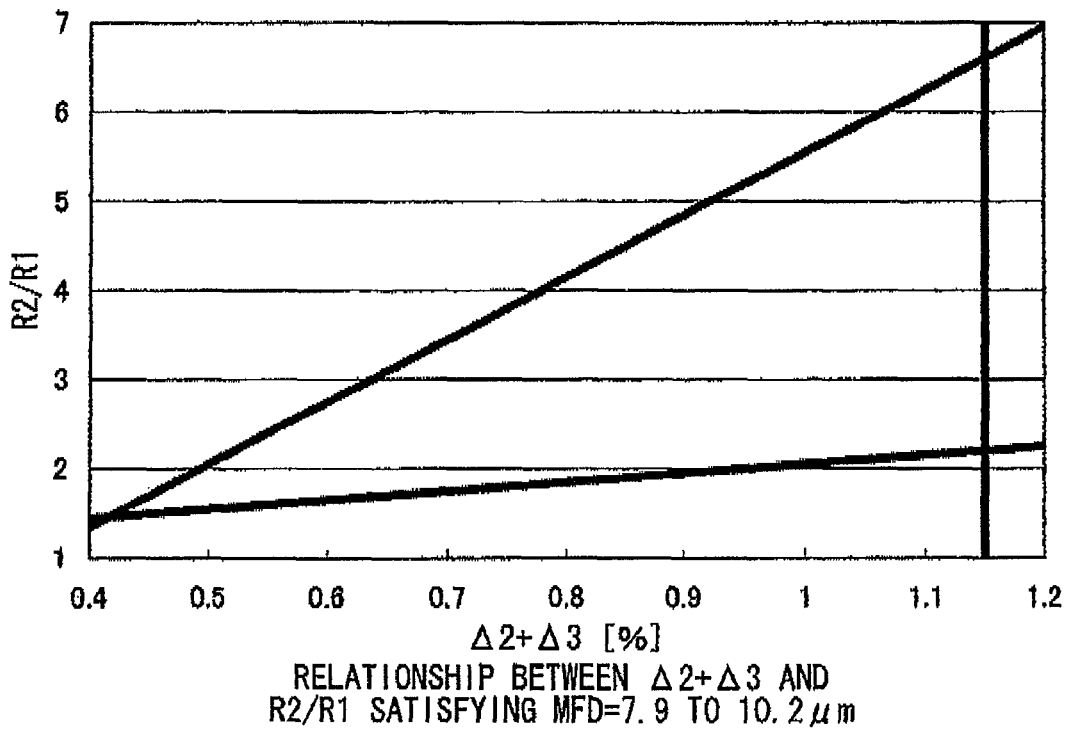
FIG. 9 is a view showing a relationship between $\Delta 2 + \Delta 3$ and R2/R1 satisfying MFD=7.9 to 10.2 μm.

In order to obtain an optical fiber for enabling the MFD at the wavelength of 1.31 μm to be in the range of 7.9 to 10.2 μm, it is preferable that ($\Delta 2 + \Delta 3$) and R2/R1 satisfy relationships of ($\Delta 2 + \Delta 3$)+1.0≦R2/R1≦7*($\Delta 2 + \Delta 3$)−1.45 and $\Delta 2 + \Delta 3 \leq 1.15$. The relationships between ($\Delta 2 + \Delta 3$) and R2/R1 satisfying the condition are shown in FIG. 9.

In addition, from the point of manufacturability of an optical fiber, it is preferable that $\Delta 3 \geq \Delta 1$.

Figure 10:
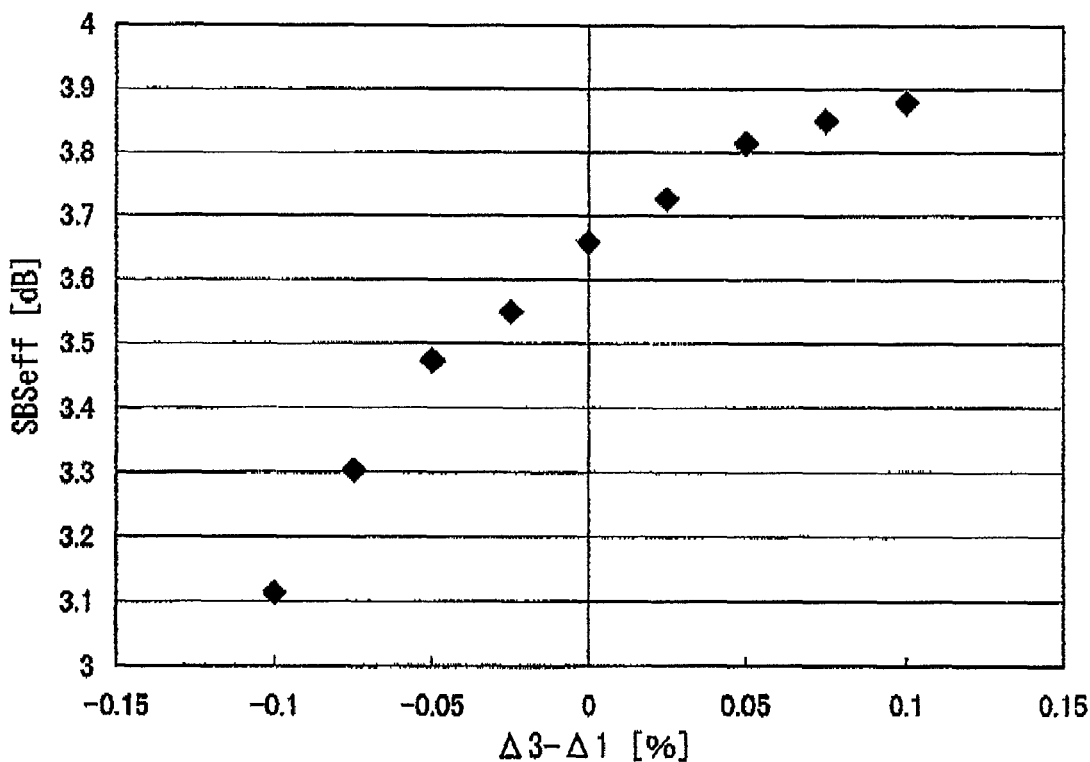
FIG. 10 is a view showing a relationship between $\Delta 3 - \Delta 1$ and SBSeff.

FIG. 10 is a view showing a relationship between $\Delta 3 - \Delta 1$ and SBSeff. As shown in FIG. 10, when $\Delta 3 - \Delta 1$ is negative, SBSeff significantly changes with a slight change in relative refractive index difference. On the other hand, when $\Delta 3 - \Delta 1$ is positive, the change rate of SBSeff with respect to the change in relative refractive index difference is small. In addition, when SBSeff is approximated to a quadratic equation of $\Delta 3 - \Delta 1$, the approximation curve is a parabola which opens down, and the inflection point is $\Delta 3 - \Delta 1 > 0$. It can be seen that the effect of SBSeff caused by the change in relative refractive index difference is small when $\Delta 3 - \Delta 1$ is positive.

When an optical fiber preform is manufactured, in some cases, due to fluctuation in dopant concentration, the relative refractive index difference is changed from a target by about ±0.05%. In this case, there is a possibility that SBSeff is decreased to be lower than a target. When $\Delta 3 - \Delta 1$ is positive, the change rate of SBSeff caused by the change in relative refractive index difference is small. Therefore, SBSeff does not significantly change with respect to the change in relative refractive index difference caused by the fluctuation in dopant concentration, and SBS characteristics that are always stable can be obtained.

In addition, in the refractive index profile of FIG. 10, $\Delta 1$ is 0.5%, $\Delta 2$ is 0.22%, $\Delta 3$ is in the range of 0.40 to 0.65% at an interval of 0.025%, and R2/R1 is 2.2. However, as shown in Table 1, in other combinations of $\Delta 1$, $\Delta 2$, $\Delta 3$, R1, R2, and R3, the inflection point is $\Delta 3 - \Delta 1 > 0$, and it can be seen that SBS characteristics which are always stable can be obtained when $\Delta 3 - \Delta 1$ is positive.

Figure 11:
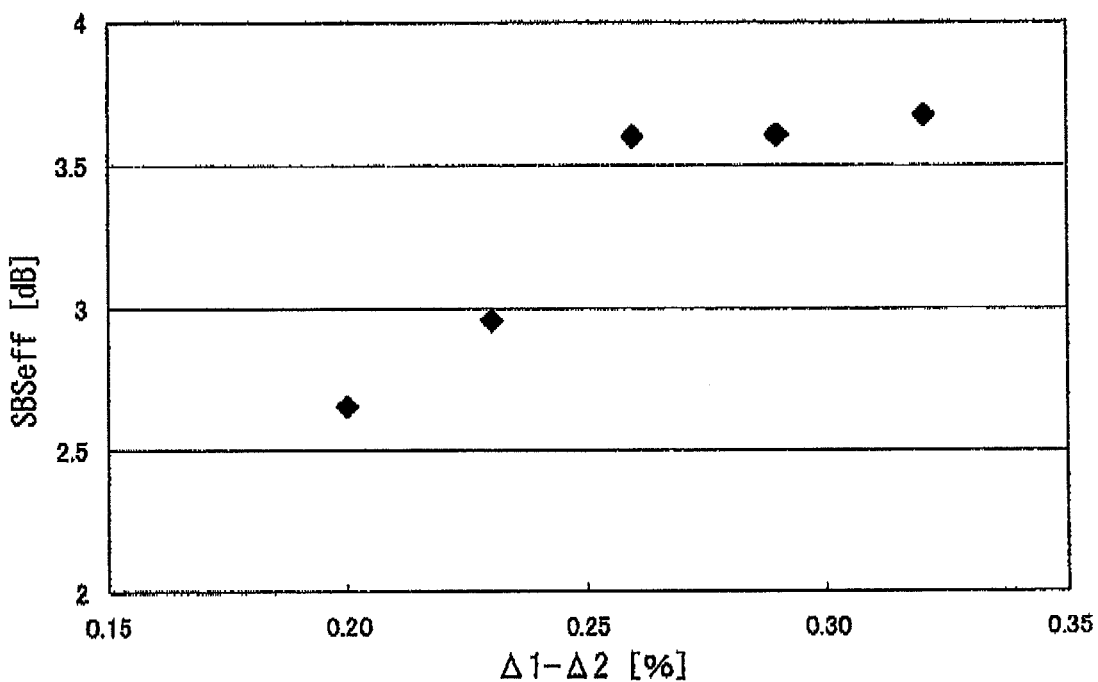
FIG. 11 is a view showing a relationship between $\Delta 1 - \Delta 2$ and SBSeff.

It is preferable that $\Delta 1 - \Delta 2$ be equal to or greater than 0.25%. FIG. 11 is a view showing a relationship between $\Delta 1 - \Delta 2$ and SBSeff. As shown in FIG. 11, when $\Delta 1$ is greater than $\Delta 2$ by 0.25% or higher, SBSeff can be significantly increased as compared with the case where the difference between $\Delta 1$ and $\Delta 2$ is equal to or smaller than 0.25%, thereby obtaining a higher SBS suppression effect. In addition, when $\Delta 1 - \Delta 2$ is equal to or greater than 0.25%, the effect of the change in relative refractive index difference caused by fluctuation in dopant concentration during manufacturing of the optical fiber preform is reduced. Therefore, even when $\Delta 1 - \Delta 2$ is changed, SBSeff does not change significantly, and degradation in yield can be prevented.

Figure 12:
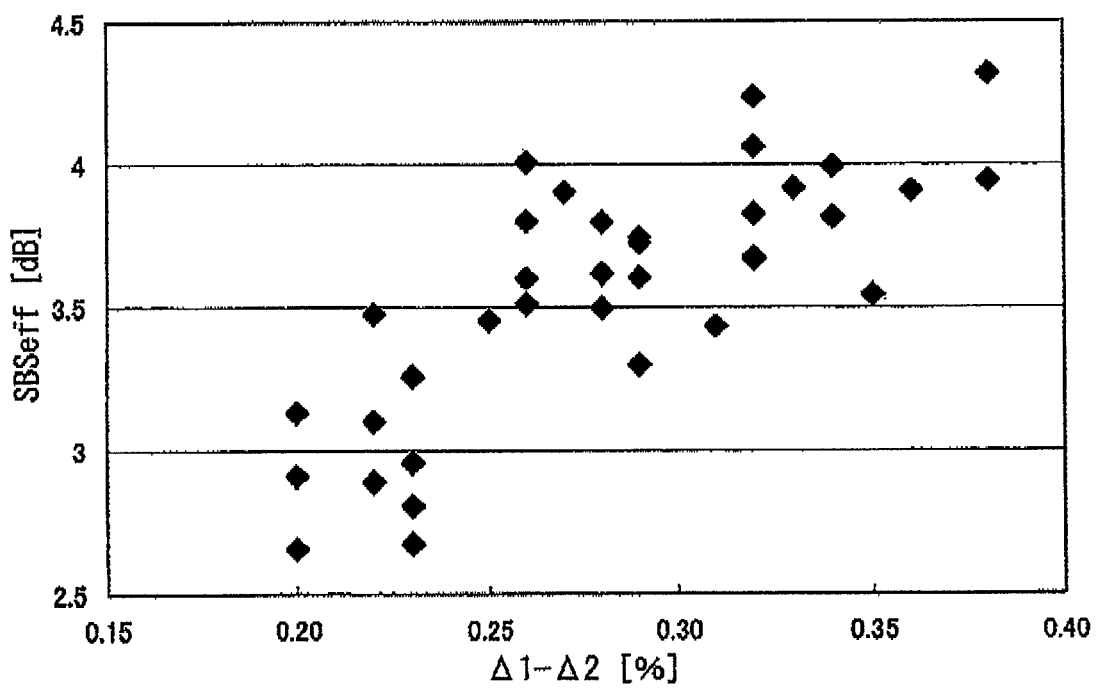
FIG. 12 is a view showing a relationship between $\Delta 1 - \Delta 2$ and SBSeff.

In the refractive index profile of FIG. 11, $\Delta 1$ is in the range of 0.44% to 0.56% at an interval of 0.03%, $\Delta 2$ is 0.24%, $\Delta 3$ is 0.55%, and R2/R1 is 2.2. However, as shown in FIG. 12, in a refractive index profile using other combinations of $\Delta 1$, $\Delta 2$, $\Delta 3$, R1, R2, and R3, that is, when $\Delta 1$ is in the range of 0.44% to 0.56%, $\Delta 2$ is in the range of 0.18% to 0.26%, $\Delta 3$ is in the range of 0.45% to 0.65%, and R2/R1 is in the range of 1.8 to 2.6, the same tendency can be obtained. Particularly, in a refractive index profile in which $\Delta 1 - \Delta 2$ is equal to or greater than 0.25%, a higher SBS suppression effect can be obtained, and dependence of SBSeff on a change in $\Delta 1 - \Delta 2$ is reduced.

TABLE 1

| $\Delta 1$ % | $\Delta 2$ % | R2/R1 — | Inflection point ($\Delta 3 - \Delta 1$) % |
|---|---|---|---|
| 0.5 | 0.22 | 2.2 | 0.10 |
| 0.5 | 0.18 | 2.2 | 0.18 |
| 0.5 | 0.26 | 2.2 | 0.02 |
| 0.44 | 0.22 | 2.2 | 0.02 |
| 0.56 | 0.22 | 2.2 | 0.12 |
| 0.5 | 0.22 | 1.6 | 0.05 |
| 0.5 | 0.22 | 2 | 0.10 |
| 0.5 | 0.22 | 2.4 | 0.01 |

In addition, by disposing the third core as described above, it is possible to obtain the SBS threshold higher than that of a conventional optical fiber by +3 dB or higher and obtain characteristics compatible with the G652.

EXAMPLES

Example 1 and Comparative Example 1

In Table 2, structural parameters and optical characteristics of an optical fiber of Example 1 which has the refractive index profile of FIG. 5 are shown. In addition, structural parameters and optical characteristics of an optical fiber of Comparative Example 1 are shown. The optical fiber of Comparative Example 1 is an SMF having a step-index profile as illustrated in FIG. 4.

TABLE 2

| | Unit | Example 1 | Comparative 1 |
|---|---|---|---|
| R1 | μm | 1.35 | 4.39 |
| R2 | μm | 2.97 | — |
| R3 | μm | 4.32 | — |
| R2/R1 | — | 2.2 | — |
| $\Delta 1$ | % | 0.50 | 0.35 |
| $\Delta 2$ | % | 0.20 | — |
| $\Delta 3$ | % | 0.50 | — |
| $\Delta 1 - \Delta 2$ | % | 0.30 | — |
| $\Delta 3 - \Delta 2$ | % | 0.30 | — |
| $\Delta 3 + \Delta 2$ | % | 0.70 | — |
| Fiber cutoff wavelength | μm | 1.32 | 1.28 |
| Cable cutoff wavelength | μm | 1.24 | 1.23 |
| MFD(Petermann II) at 1.31 μm | μm | 9.2 | 9.2 |
| Zero-dispersion wavelength | nm | 1321.1 | 1309.2 |
| Zero-dispersion slope | ps/nm$^2$-km | 0.0888 | 0.0882 |
| 20 mm diameter bending loss at 1.31 μm | dB/m | 0.08 | 0.11 |
| SBS threshold at 1.55 μm 20 km | dBm | 12.2 | 8.7 |

As shown in Table 2, the optical fiber having the structural parameters of Example 1 related to the invention had an SBS threshold of 12.2 dBm for a length of 20 km, and could obtain a higher suppression effect than the optical fiber of Comparative Example 1 which had the same MFD by +3.5 dB. In addition, the optical fiber of Example 1 had the same optical characteristics as the SMF of Comparative Example 1 and satisfied the G652 standard.

Examples 1a to 1g

Table 3 shows results in the case where structural parameters of Example 1 are represented by using X, Y, and R2/R1 described above.

TABLE 3

| | Unit | Example 1a | Example 1b | Example 1c | Example 1d | Example 1e | Example 1f | Example 1g |
|---|---|---|---|---|---|---|---|---|
| R1 | μm | 1.53 | 1.50 | 1.35 | 1.26 | 1.16 | 1.03 | 1.03 |
| R2 | μm | 2.91 | 3.29 | 2.98 | 3.15 | 2.91 | 3.21 | 3.20 |
| R3 | μm | 4.44 | 4.79 | 4.34 | 4.41 | 4.08 | 4.24 | 4.24 |
| R2/R1 | — | 1.9 | 2.2 | 2.2 | 2.5 | 2.5 | 3.1 | 3.1 |
| $\Delta 1$ | % | 0.50 | 0.50 | 0.40 | 0.60 | 0.30 | 0.50 | 0.60 |
| $\Delta 2$ | % | 0.05 | 0.20 | 0.20 | 0.20 | 0.20 | 0.20 | 0.20 |
| $\Delta 3$ | % | 0.50 | 0.40 | 0.50 | 0.50 | 0.60 | 0.60 | 0.60 |
| $\Delta 1 - \Delta 2$ | % | 0.45 | 0.30 | 0.20 | 0.40 | 0.10 | 0.30 | 0.40 |
| $\Delta 3 - \Delta 2$ | % | 0.45 | 0.20 | 0.30 | 0.30 | 0.40 | 0.40 | 0.40 |
| $\Delta 3 + \Delta 2$ | % | 0.55 | 0.60 | 0.70 | 0.70 | 0.80 | 0.80 | 0.80 |

TABLE 3-continued

|  | Unit | Example 1a | Example 1b | Example 1c | Example 1d | Example 1e | Example 1f | Example 1g |
|---|---|---|---|---|---|---|---|---|
| Fiber cutoff Wavelength | μm | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 |
| MFD(Petermann II) at 1.31 μm | μm | 9.47 | 9.56 | 9.48 | 9.11 | 9.22 | 9.45 | 9.27 |
| Zero-dispersion wavelength | nm | 1321.6 | 1314.3 | 1309 | 1321.1 | 1323.7 | 1314.7 | 1317.3 |
| Zero-dispersion slope | ps/nm$^2$-km | 0.09 | 0.0907 | 0.0892 | 0.0899 | 0.0895 | 0.0895 | 0.0893 |
| 20 mm diameter bending loss at 1.31 μm | dB/m | 0.39 | 0.19 | 0.24 | 0.07 | 0.30 | 0.30 | 0.16 |
| SBS threshold at 1.55 μm 20 km | dBm | 13.1 | 13.1 | 12.5 | 13.3 | 12.4 | 13.2 | 12.9 |

Figure 13:
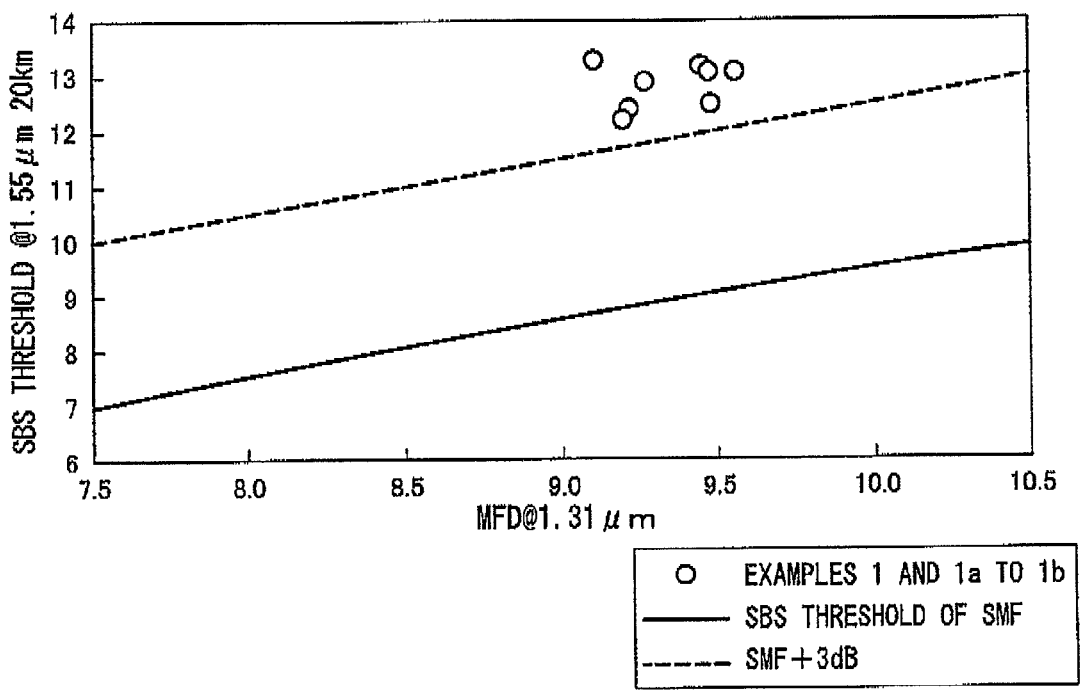
FIG. 13 is a view showing relationships between SBS thresholds and MFDs of Examples 1 and 1a to 1g.

The optical fibers having the structural parameters of Examples 1a to 1g shown in Table 3 had SBS thresholds of 12.4 to 13.3 dBm for a length of 20 km as shown in FIG. 13 and could obtain suppression effects higher than the SMF having the same MFD by +3.7 to +4.6 dB. In addition, the optical characteristics of the optical fibers of Examples 1a to 1g all satisfied the G652 standard.

Examples 1h to 1v

Figure 14:
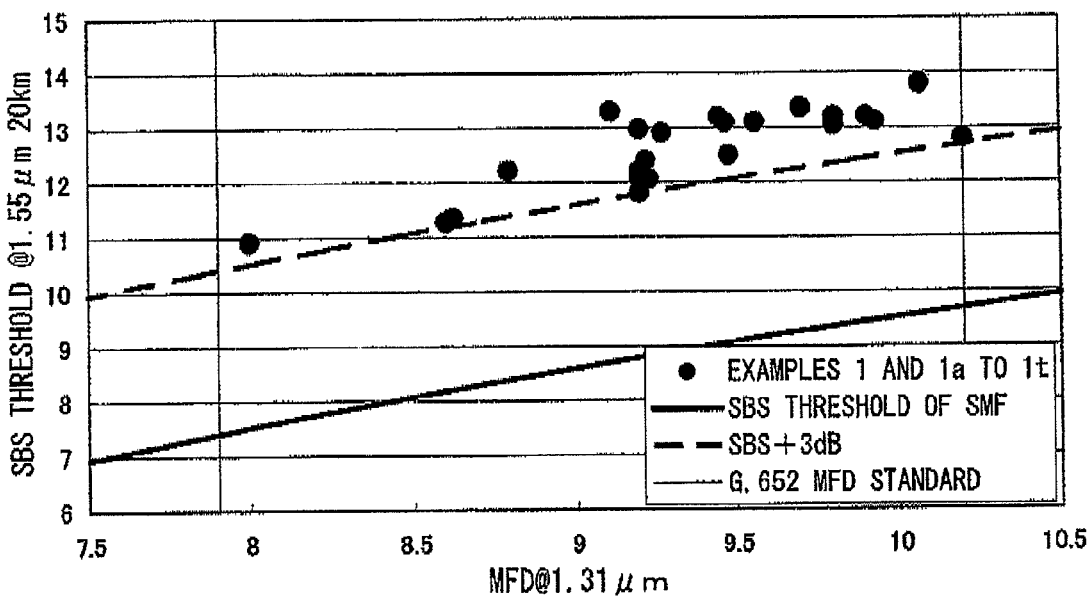
FIG. 14 is a view showing relationships between SBS thresholds and MFDs of Examples 1 and 1a to 1v.

Tables 4 and 5 show results in the case where structural parameters of Example 1 are represented by using X, Y, and R2/R1 described above. The optical fibers having the structural parameters of Examples 1a to 1g shown in Table 3 and Examples 1h to 1v shown in Tables 4 and 5 had SBS thresholds of 10.9 to 13.8 dBm for a length of 20 km as shown in FIG. 14 and could obtain suppression effects higher than the SMF having the same MFD by +3.1 to +4.5 dB. In addition, the optical characteristics of the optical fibers of Examples 1h to 1v all satisfied the G652 standard.

TABLE 4

|  | Unit | Example 1h | Example 1i | Example 1j | Example 1k | Example 1l | Example 1m | Example 1n |
|---|---|---|---|---|---|---|---|---|
| R1 | μm | 1.81 | 1.69 | 3.14 | 1.33 | 2.80 | 1.12 | 1.74 |
| R2 | μm | 2.90 | 3.21 | 5.81 | 3.33 | 5.33 | 3.48 | 6.80 |
| R3 | μm | 4.71 | 4.90 | 8.95 | 4.67 | 8.13 | 4.60 | 8.54 |
| R2/R1 | — | 1.6 | 1.9 | 1.9 | 2.5 | 1.9 | 3.1 | 3.9 |
| Δ1 | % | 0.50 | 0.50 | 0.50 | 0.50 | 0.40 | 0.50 | 0.60 |
| Δ2 | % | 0.10 | 0.10 | 0.20 | 0.10 | 0.20 | 0.20 | 0.20 |
| Δ3 | % | 0.40 | 0.40 | 0.40 | 0.50 | 0.50 | 0.50 | 0.60 |
| Δ1 − Δ2 | % | 0.40 | 0.40 | 0.30 | 0.40 | 0.20 | 0.30 | 0.40 |
| Δ3 − Δ2 | % | 0.30 | 0.30 | 0.20 | 0.40 | 0.30 | 0.30 | 0.40 |
| Δ3 + Δ2 | % | 0.50 | 0.50 | 0.60 | 0.60 | 0.70 | 0.70 | 0.80 |
| Fiber cutoff wavelength | μm | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 |
| MFD(Petermann II) at 1.31 μm | μm | 9.23 | 9.7 | 9.2 | 10.07 | 9.2 | 9.93 | 9.8 |
| Zero-dispersion wavelength | nm | 1321.8 | 1322.8 | 1316.5 | 1317.9 | 1310 | 1307.6 | 1312 |
| Zero-dispersion slope | ps/nm$^2$-km | 0.092 | 0.093 | 0.092 | 0.093 | 0.091 | 0.092 | 0.092 |
| 20 mm diameter bending loss at 1.31 μm | dB/m | 0.08 | 0.48 | 0.05 | 1.91 | 0.08 | 0.72 | 0.70 |
| SBS threshold at 1.55 μm 20 km | dBm | 12.1 | 13.4 | 12.1 | 13.8 | 11.8 | 13.1 | 13.1 |

TABLE 5

|  | Unit | Example 1o | Example 1p | Example 1q | Example 1r | Example 1s | Example 1t | Example 1u | Example 1v |
|---|---|---|---|---|---|---|---|---|---|
| R1 | μm | 1.47 | 1.65 | 1.11 | 2.57 | 1.04 | 1.16 | 3.71 | 1.15 |
| R2 | μm | 6.85 | 6.28 | 2.78 | 4.86 | 2.60 | 2.90 | 5.94 | 7.25 |
| R3 | μm | 8.32 | 7.93 | 3.89 | 7.44 | 3.63 | 4.06 | 9.65 | 8.40 |
| R2/R1 | — | 4.7 | 3.8 | 2.5 | 1.9 | 2.5 | 2.5 | 1.6 | 6.3 |
| Δ1 | % | 0.60 | 0.70 | 0.40 | 0.40 | 0.60 | 0.60 | 0.40 | 0.30 |

TABLE 5-continued

|  | Unit | Example 1o | Example 1p | Example 1q | Example 1r | Example 1s | Example 1t | Example 1u | Example 1v |
|---|---|---|---|---|---|---|---|---|---|
| Δ2 | % | 0.20 | 0.20 | 0.30 | 0.20 | 0.30 | 0.20 | 0.04 | 0.20 |
| Δ3 | % | 0.70 | 0.70 | 0.60 | 0.60 | 0.70 | 0.60 | 0.40 | 0.90 |
| Δ1 − Δ2 | % | 0.40 | 0.50 | 0.10 | 0.20 | 0.30 | 0.40 | 0.36 | 0.10 |
| Δ3 − Δ2 | % | 0.50 | 0.50 | 0.30 | 0.40 | 0.40 | 0.40 | 0.36 | 0.70 |
| Δ3 + Δ2 | % | 0.90 | 0.90 | 0.90 | 0.80 | 1.00 | 0.80 | 0.44 | 1.10 |
| Fiber cutoff wavelength | μm | 1.32 | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 | 1.24 |
| MFD(Petermann II) at 1.31 μm | μm | 9.8 | 9.2 | 8.6 | 8.6 | 8.0 | 8.8 | 10.2 | 9.9 |
| Zero-dispersion wavelength | nm | 1314.4 | 1322 | 1314.9 | 1322.3 | 1323.8 | 1321.2 | 1308.3 | 1324 |
| Zero-dispersion slope | ps/nm²-km | 0.093 | 0.091 | 0.089 | 0.089 | 0.087 | 0.090 | 0.093 | 0.093 |
| 20 mm diameter bending loss at 1.31 μm | dB/m | 0.92 | 0.17 | 0.01 | 0.02 | 0.00 | 0.03 | 1.20 | 1.80 |
| SBS threshold at 1.55 μm 20 km | dBm | 13.2 | 13.0 | 11.4 | 11.3 | 10.9 | 12.2 | 12.8 | 13.2 |

Examples 2a to 2f

Table 6 shows optical characteristics in the case where structural parameters of a refractive index profile of the optical fiber having the refractive index profile of FIG. 6 are represented by using X, Y, and R2/R1 described above.

TABLE 6

|  | Unit | Example 2a | Example 2b | Example 2c | Example 2d | Example 2e | Example 2f |
|---|---|---|---|---|---|---|---|
| R1 | μm | 1.51 | 1.39 | 1.43 | 1.31 | 1.11 | 1.33 |
| R2 | μm | 3.03 | 3.05 | 2.87 | 3.13 | 3.10 | 3.45 |
| R2 | μm | 4.60 | 4.49 | 4.36 | 4.49 | 4.25 | 4.83 |
| R2/R1 | % | 2.00 | 2.20 | 2.00 | 2.40 | 2.80 | 2.60 |
| Δ1 | % | 0.50 | 0.50 | 0.44 | 0.56 | 0.44 | 0.40 |
| Δ2 | % | 0.24 | 0.22 | 0.18 | 0.18 | 0.26 | 0.30 |
| Δ3 | % | 0.50 | 0.60 | 0.70 | 0.70 | 0.70 | 0.70 |
| Δ1 − Δ2 | % | 0.26 | 0.28 | 0.26 | 0.38 | 0.18 | 0.10 |
| Δ3 − Δ2 | % | 0.26 | 0.38 | 0.52 | 0.52 | 0.44 | 0.40 |
| Δ3 + Δ2 | % | 0.74 | 0.82 | 0.88 | 0.88 | 0.96 | 1.00 |
| Fiber cutoff wavelength | μm | 1.32 | 1.32 | 1.32 | 1.32 | 1.32 | 1.32 |
| Cable cutoff wavelength | μm | 1.24 | 1.24 | 1.24 | 1.24 | 1.24 | 1.24 |
| MFD(Petermann II) at 1.31 μm | μm | 9.2 | 9.36 | 9.44 | 9.39 | 9.37 | 9.1 |
| Zero-dispersion wavelength | nm | 1317.9 | 1314.9 | 1314.2 | 1322.6 | 1309.5 | 1308.1 |
| Zero-dispersion slope | ps/nm²-km | 0.0906 | 0.0905 | 0.0902 | 0.0914 | 0.0897 | 0.0898 |
| 20 mm diameter bending loss at 1.31 μm | dB/m | 0.39 | 0.69 | 1.42 | 1.35 | 0.92 | 0.15 |
| SBS threshold at 1.55 μm | dBm | 12.0 | 12.8 | 13.0 | 13.7 | 12.3 | 12.0 |

Figure 15:
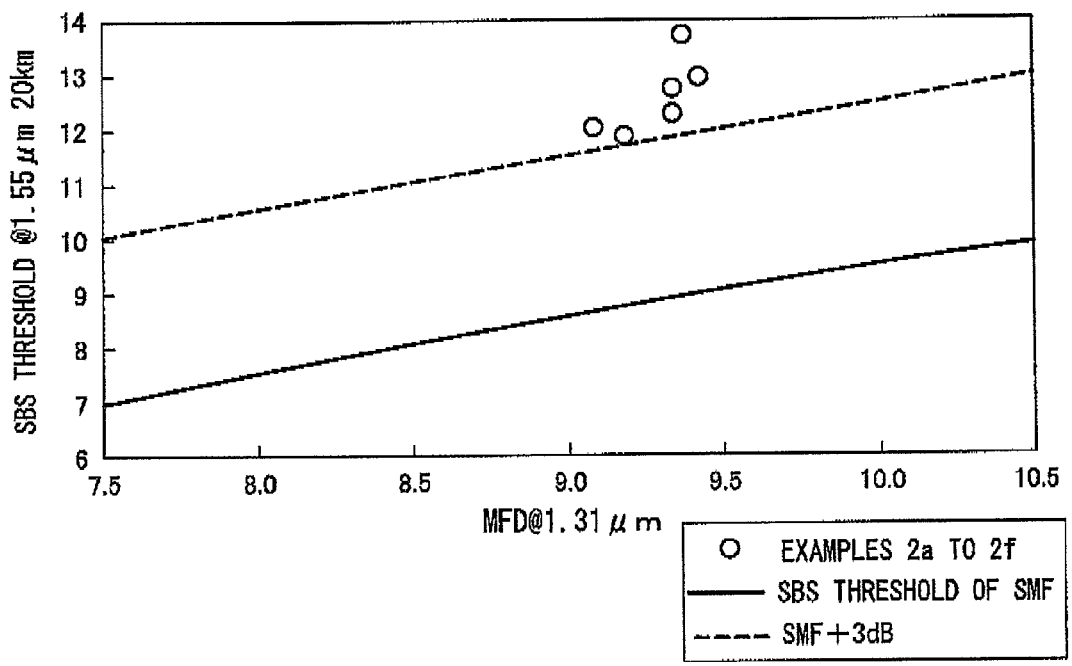
FIG. 15 is a view showing relationships between SBS thresholds and MFDs of Examples 2a to 2f.

The optical fibers having the structural parameters of Examples 2a to 2f shown in Table 6 had SBS thresholds of 12.0 to 13.7 dBm for a length of 20 km as shown in FIG. 15 and could obtain suppression effects higher than the SMF having the same MFD by +3.3 to +5.0 dB. In addition, the optical characteristics of the optical fibers of Examples 2a to 2f all satisfied the G652 standard.

In addition, by changing the refractive index of the third core as illustrated in FIG. 6, the amount of dopant $GeO_2$ in the core can be reduced, so that it is possible to reduce a loss in the optical fiber.

Examples 2g to 2m

Figure 16:
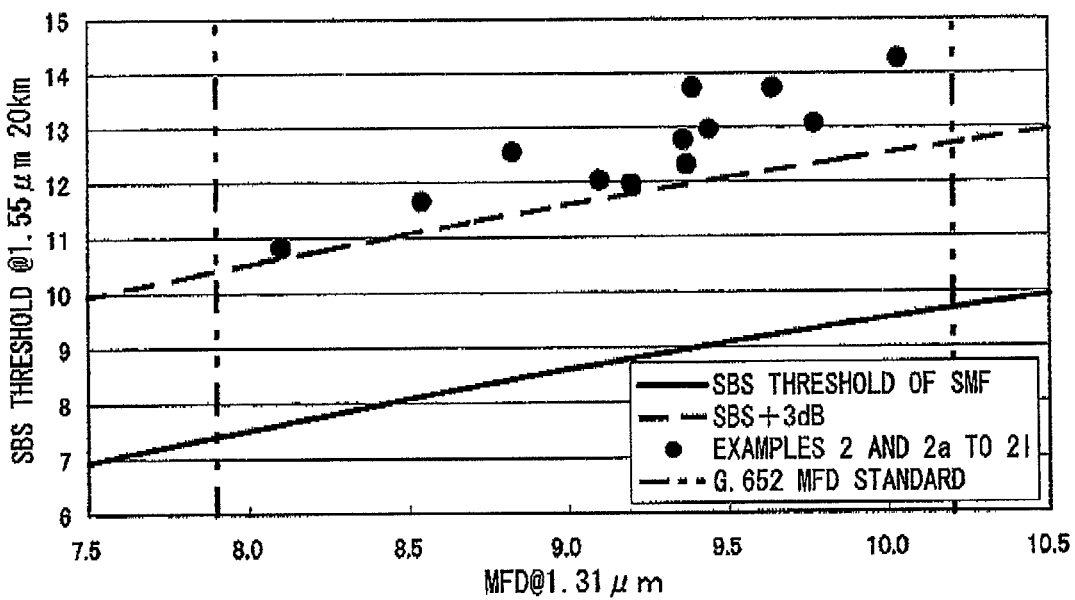
FIG. 16 is a view showing relationships between SBS thresholds and MFDs of Examples 2g to 2m.

Table 7 shows optical characteristics in the case where structural parameters of a refractive index profile of the optical fiber having the refractive index profile of FIG. 6 are represented by using X, Y, and R2/R1 described above. The optical fibers having the structural parameters of Examples 2a to 2f shown in Table 6 and Examples 2g to 2m shown in Table 7 had SBS thresholds of 10.8 to 14.3 dBm for a length of 20 km as shown in FIG. 16 and could obtain suppression effects higher than the SMF having the same MFD by +3.2 to +4.7 dB. In addition, the optical characteristics of the optical fibers of Examples 2g to 2m all satisfied the G652 standard.

TABLE 7

|  | Unit | Example 2g | Example 2h | Example 2i | Example 2j | Example 2k | Example 2l | Example 2m |
|---|---|---|---|---|---|---|---|---|
| R1 | μm | 1.56 | 1.51 | 1.68 | 1.58 | 1.81 | 1.35 | 1.41 |
| R2 | μm | 3.13 | 3.33 | 3.69 | 4.10 | 3.62 | 2.97 | 2.82 |
| R3 | μm | 4.76 | 4.91 | 5.43 | 5.74 | 5.51 | 4.37 | 4.28 |
| R2/R1 | — | 2.0 | 2.2 | 2.2 | 2.6 | 2.0 | 2.2 | 2.0 |
| Δ1 | % | 0.56 | 0.56 | 0.50 | 0.50 | 0.44 | 0.50 | 0.44 |
| Δ2 | % | 0.24 | 0.22 | 0.15 | 0.18 | 0.18 | 0.35 | 0.20 |
| Δ3 | % | 0.70 | 0.70 | 0.70 | 0.55 | 0.55 | 0.80 | 0.70 |
| Δ1 − Δ2 | % | 0.32 | 0.34 | 0.35 | 0.32 | 0.26 | 0.15 | 0.24 |
| Δ3 − Δ2 | % | 0.46 | 0.48 | 0.55 | 0.37 | 0.37 | 0.45 | 0.50 |
| Δ3 + Δ2 | % | 0.94 | 0.92 | 0.85 | 0.73 | 0.73 | 1.15 | 0.90 |
| Fiber cutoff wavelength | μm | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 |
| MFD(Petermann II) at 1.31 μm | μm | 8.54 | 8.83 | 9.64 | 10.03 | 9.77 | 8.1 | 9.2 |
| Zero-dispersion wavelength | nm | 1322.4 | 1321.7 | 1317.1 | 1315.6 | 1310.9 | 1317 | 1314 |
| Zero-dispersion slope | ps/nm$^2$-km | 0.088 | 0.090 | 0.093 | 0.093 | 0.092 | 0.087 | 0.090 |
| 20 mm diameter bending loss at 1.31 μm | dB/m | 0.01 | 0.05 | 0.40 | 1.36 | 0.64 | 0.00 | 0.18 |
| SBS threshold at 1.55 μm 20 km | dBm | 11.7 | 12.6 | 13.7 | 14.3 | 13.1 | 10.8 | 12.6 |

Examples 3 and 4

Figure 17:
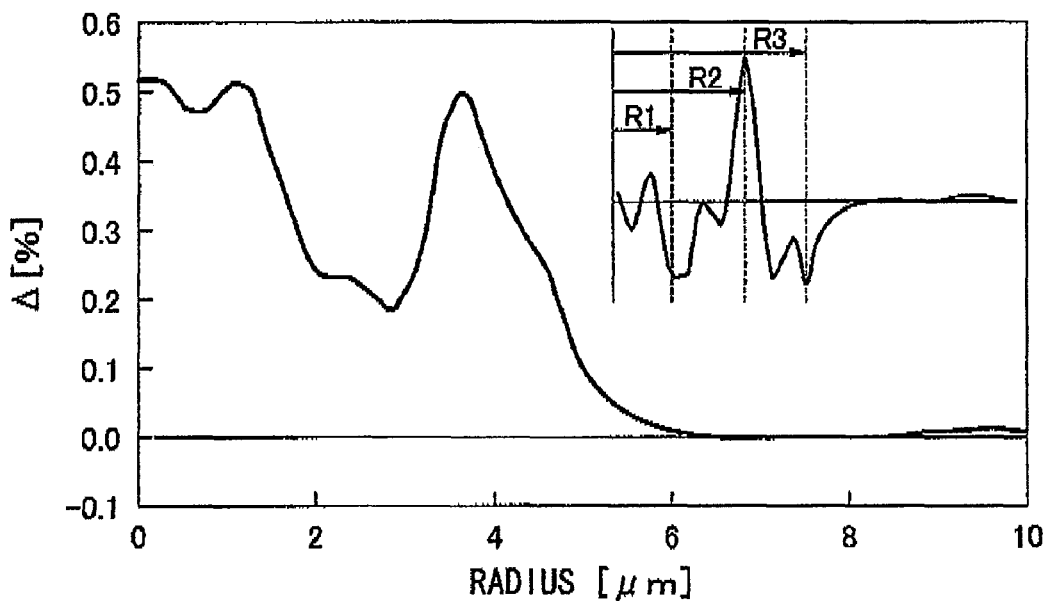
FIG. 17 is a view showing a refractive index profile of an optical fiber of Example 3.

FIG. 17 shows a refractive index profile of an optical fiber of Example 3 related to the invention. The refractive index profile in Example 3, as shown in FIG. 17, is constituted by: a three-layer structured tore which includes, in the central portion of the core, a first core in a region from the center of the core to a radius of R1 μm, a second core which surrounds and comes in contact with the first core in a region from the radius of R1 μm to a radius of R2 μm, and a third core which surrounds and comes in contact with the second core in a region from the radius of R2 μam to a radius of R3 μm; and a cladding which surrounds and comes in contact with the three-layer structured core. However, unlike in Examples 1 and 2, the refractive index profile of the core smoothly changes, and the boundary thereof is obscure. Therefore, by using the change rate (dΔ/dr) of the relative refractive index difference in the radial direction, the diameter of each layer was determined. The relative refractive index difference Δ1 of the first core, as represented by the following equation (1), is defined as Δ which becomes equivalently uniform in the region from the center of the core to the radius R1, the relative refractive index difference Δ2 of the second core is defined as a relative refractive index difference that becomes a minimum value in the region between the radii R1 and R2 μm, and the relative refractive index difference Δ3 of the third core is defined as a relative refractive index difference that becomes a maximum value in the region between the radii R2 and R3 μm.

Equation 1

$$\Delta 1 = \frac{\int_0^{R1} \Delta(r) r \, dr}{\int_0^{R1} r \, dr} \quad (1)$$

The structural parameters of the optical fiber of Example 3 defined as described above and the optical characteristics thereof are shown in Table 8. In addition, in Table 8, the structural parameters of the optical fiber of Example 4 having the same refractive index profile as Example 3 and the optical characteristics thereof are shown.

TABLE 8

|  | Unit | Example 3 | Example 4 |
|---|---|---|---|
| R1 | μm | 1.36 | 1.73 |
| R2 | μm | 3.11 | 3.16 |
| R3 | μm | 4.58 | 4.67 |
| R2/R1 | — | 2.29 | 1.83 |
| Δ1 | % | 0.50 | 0.53 |
| Δ2 | % | 0.18 | 0.18 |
| Δ3 | % | 0.48 | 0.53 |
| Δ1 − Δ2 | % | 0.32 | 0.35 |
| Δ3 − Δ2 | % | 0.30 | 0.35 |
| Δ3 + Δ2 | % | 0.66 | 0.71 |
| Fiber cutoff wavelength | μm | 1.32 | 1.32 |
| Cable cutoff wavelength | μm | 1.24 | 1.23 |
| MFD(Petermann II) at 1.31 μm | μm | 9.55 | 9.25 |
| Zero-dispersion wavelength | nm | 1316.4 | 1320.4 |
| Zero-dispersion slope | ps/nm$^2$-km | 0.089 | 0.089 |
| 20 mm diameter bending loss at 1.31 μm | dB/m | 0.23 | 0.07 |
| SBS threshold at 1.55 μm 20 km | dBm | 12.7 | 12.2 |
| loss at 1.55 μm | dB/km | 0.191 | 0.196 |

As shown in Table 8, the optical fibers of Examples 3 and 4 had SBS thresholds of 12.2 to 12.7 dBm for a length of 20 km, and could obtain higher suppression effects than the SMF having the same MFD by +3.5 to +4.0 dB. In addition, the optical fibers of Examples 3 and 4 all satisfied the G652 standard.

Example 5

Figure 18:
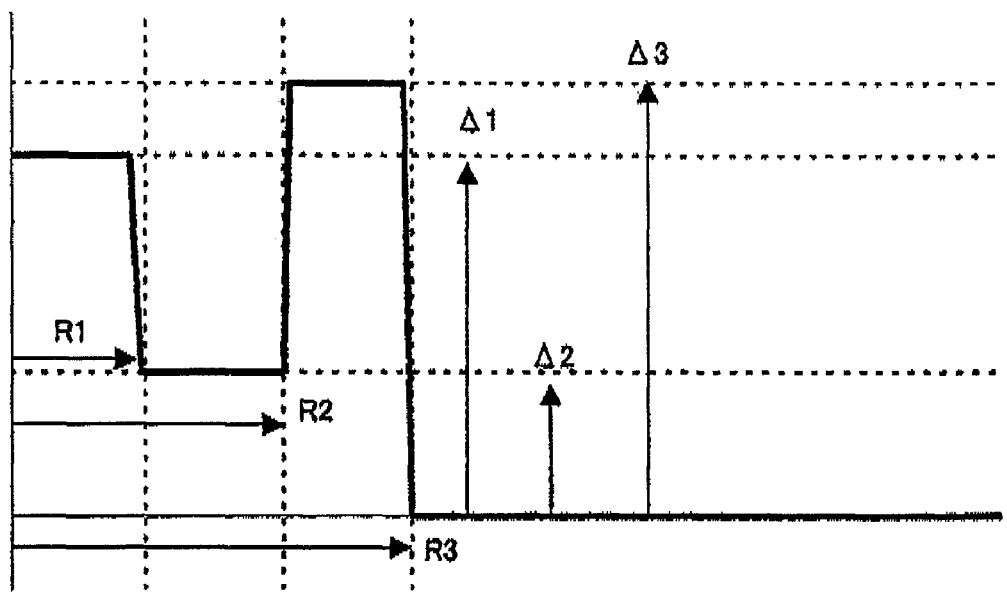
FIG. 18 is a view showing a refractive index profile of an optical fiber preform of Example 5.

FIG. 18 is a refractive index profile of an optical fiber preform of Example 5. The optical fiber preform in this example, as shown in FIG. 18, is constituted by: a three-layer structured core which includes, in the central portion of the core, a first core having a substantially uniform positive relative refractive index difference Δ1 in a region from the center of the core to a radius of R1 μm, a second core which surrounds and comes in contact with the first core and has a substantially uniform positive relative refractive index difference Δ2 in a region from the radius of R1 μm to a radius of R2 μm, and a third core which surrounds and comes in contact with the second core and has a substantially uniform positive relative refractive index difference Δ3 in a region from the radius of R2 μm to a radius of R3 μm. Like Examples 1 and 2, the three-layer structured core is included.

Figure 19:
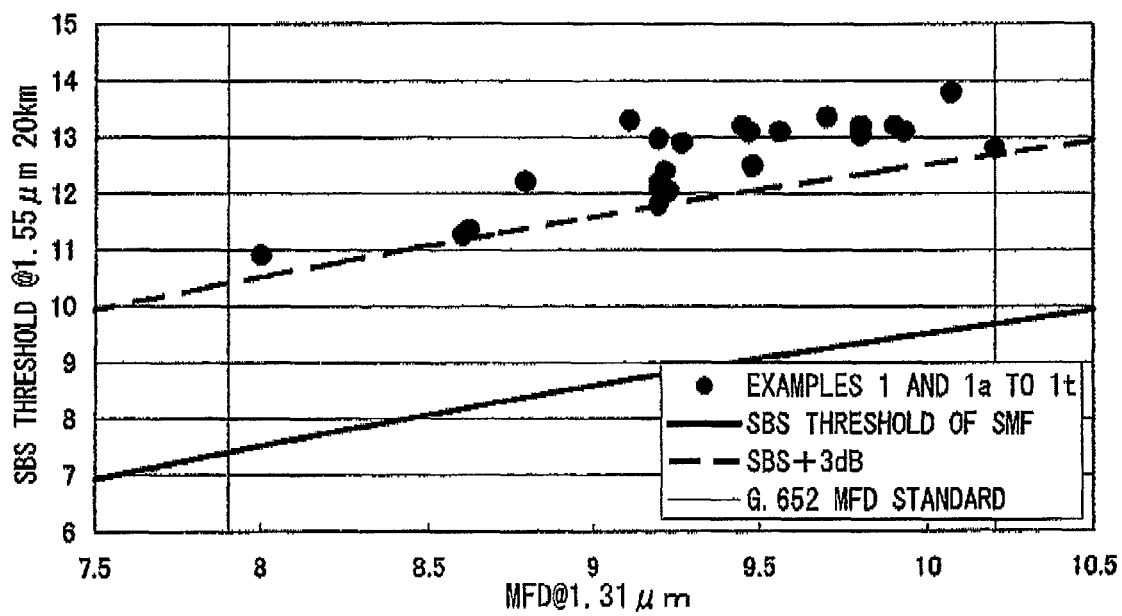
FIG. 19 is a view showing relationships between SBS thresholds and MFDs of Example 5.

Structural parameters of the optical fiber preform of Example 5 are represented in Tables 9 and 10 by using X, Y, and R2/R1 described above, and optical characteristics that were exhibited when the preform was drawn into an optical fiber are shown. The optical fiber drawn from the optical fiber preform of Example 5 had an SBS threshold of 10.9 to 13.8 dBm for a length of 20 km as shown in FIG. 19, and obtained a suppression effect higher than the SMF having the same MFD by +3.1 to +4.5 dB, so that the G652 standard was further satisfied.

TABLE 9

|  | Unit | Example 5a | Example 5b | Example 5c | Example 5d | Example 5e | Example 5f | Example 5g |
|---|---|---|---|---|---|---|---|---|
| R1 | μm | 1.32 | 1.81 | 1.69 | 3.14 | 1.33 | 2.80 | 1.12 |
| R2 | μm | 2.75 | 2.90 | 3.21 | 5.81 | 3.33 | 5.33 | 3.48 |
| R3 | μm | 4.04 | 4.71 | 4.90 | 8.95 | 4.67 | 8.13 | 4.60 |
| R2/R1 | — | 2.1 | 1.6 | 1.9 | 1.9 | 2.5 | 1.9 | 3.1 |
| Δ1 | % | 0.50 | 0.50 | 0.50 | 0.50 | 0.50 | 0.40 | 0.50 |
| Δ2 | % | 0.20 | 0.10 | 0.10 | 0.20 | 0.10 | 0.20 | 0.20 |
| Δ3 | % | 0.60 | 0.40 | 0.40 | 0.40 | 0.50 | 0.50 | 0.50 |
| Δ1 − Δ2 | % | 0.30 | 0.40 | 0.40 | 0.30 | 0.40 | 0.20 | 0.30 |
| Δ3 − Δ2 | % | 0.40 | 0.30 | 0.30 | 0.20 | 0.40 | 0.30 | 0.30 |
| Δ3 + Δ2 | % | 0.80 | 0.50 | 0.50 | 0.60 | 0.60 | 0.70 | 0.70 |
| Fiber cutoff wavelength | μm | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 124 | 1.24 |
| MFD(Petermann II) at 1.31 μm | μm | 8.89 | 9.23 | 9.7 | 9.2 | 10.07 | 9.2 | 9.93 |
| Zero-dispersion wavelength | nm | 1318.5 | 1321.8 | 1322.8 | 1316.5 | 1317.9 | 1310 | 1307.6 |
| Zero-dispersion slope | ps/nm$^2$-km | 0.090 | 0.092 | 0.093 | 0.092 | 0.093 | 0.091 | 0.092 |
| 20 mm diameter bending loss at 1.31 μm | dB/m | 0.03 | 0.08 | 0.48 | 0.05 | 1.91 | 0.08 | 0.72 |
| SBS threshold at 1.55 μm 20 km | dBm | 12.0 | 12.1 | 13.4 | 12.1 | 13.8 | 11.8 | 13.1 |

TABLE 10

|  | Unit | Example 5h | Example 5i | Example 5j | Example 5k | Example 5l | Example 5m | Example 5n | Example 5o |
|---|---|---|---|---|---|---|---|---|---|
| R1 | μm | 1.47 | 1.65 | 1.11 | 2.57 | 1.04 | 1.16 | 3.71 | 1.15 |
| R2 | μm | 6.85 | 6.28 | 2.78 | 4.86 | 2.60 | 2.90 | 5.94 | 7.25 |
| R3 | μm | 8.32 | 7.93 | 3.89 | 7.44 | 3.63 | 4.06 | 9.65 | 8.40 |
| R2/R1 | — | 4.7 | 3.8 | 2.5 | 1.9 | 2.5 | 2.5 | 1.6 | 6.3 |
| Δ1 | % | 0.60 | 0.70 | 0.40 | 0.40 | 0.60 | 0.60 | 0.40 | 0.30 |
| Δ2 | % | 0.20 | 0.20 | 0.30 | 0.20 | 0.30 | 0.20 | 0.04 | 0.20 |
| Δ3 | % | 0.70 | 0.70 | 0.60 | 0.60 | 0.70 | 0.60 | 0.40 | 0.90 |
| Δ1 − Δ2 | % | 0.40 | 0.50 | 0.10 | 0.20 | 0.30 | 0.40 | 0.36 | 0.10 |
| Δ3 − Δ2 | % | 0.50 | 0.50 | 0.30 | 0.40 | 0.40 | 0.40 | 0.36 | 0.70 |
| Δ3 + Δ2 | % | 0.90 | 0.90 | 0.90 | 0.80 | 1.00 | 0.80 | 0.44 | 1.10 |
| Fiber cutoff wavelength | μm | 1.32 | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 | 1.24 |
| MFD(Petermann II) at 1.31 μm | μm | 9.8 | 9.2 | 8.6 | 8.6 | 8.0 | 8.8 | 10.2 | 9.9 |
| Zero-dispersion wavelength | nm | 1314.4 | 1322 | 1314.9 | 1322.3 | 1323.8 | 1321.2 | 1308.3 | 1324 |
| Zero-dispersion slope | ps/nm$^2$-km | 0.093 | 0.091 | 0.089 | 0.089 | 0.087 | 0.090 | 0.093 | 0.093 |
| 20 mm diameter bending loss at 1.31 μm | dB/m | 0.92 | 0.17 | 0.01 | 0.02 | 0.00 | 0.03 | 1.20 | 1.80 |
| SBS threshold at 1.55 μm 20 km | dBm | 13.2 | 13.0 | 11.4 | 11.3 | 10.9 | 12.2 | 12.8 | 13.2 |

Example 6

Figure 20:
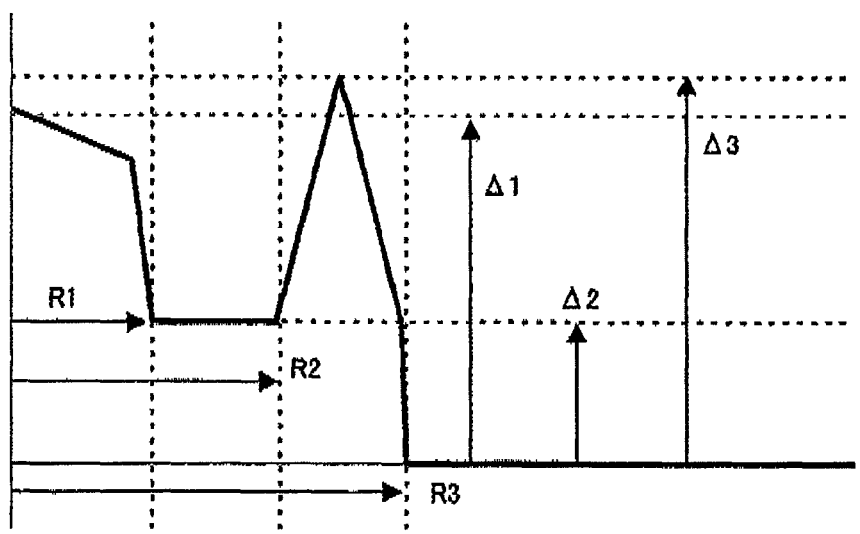
FIG. 20 is a view showing a refractive index profile of an optical fiber preform of Example 6.

FIG. 20 shows a refractive index profile of an optical fiber preform of Example 6. The optical fiber preform in this example, as shown in FIG. 20, is constituted by: a three-layer structured core which includes, in the central portion of the core, a first core having a maximum relative refractive index difference Δ1 in a region from the center of the core to a radius of R1 μm, a second core which surrounds and comes in contact with the first core and has a minimum relative refractive index difference Δ2 in a region from the radius of R1 μm to a radius of R2 μm, and a third core which surrounds and comes in contact with the second core and has a maximum relative refractive index difference Δ3 in a region from the radius of R2 μm to a radius of R3 μm. Like Examples 1 and 2, the three-layer structured core is included.

Figure 21:
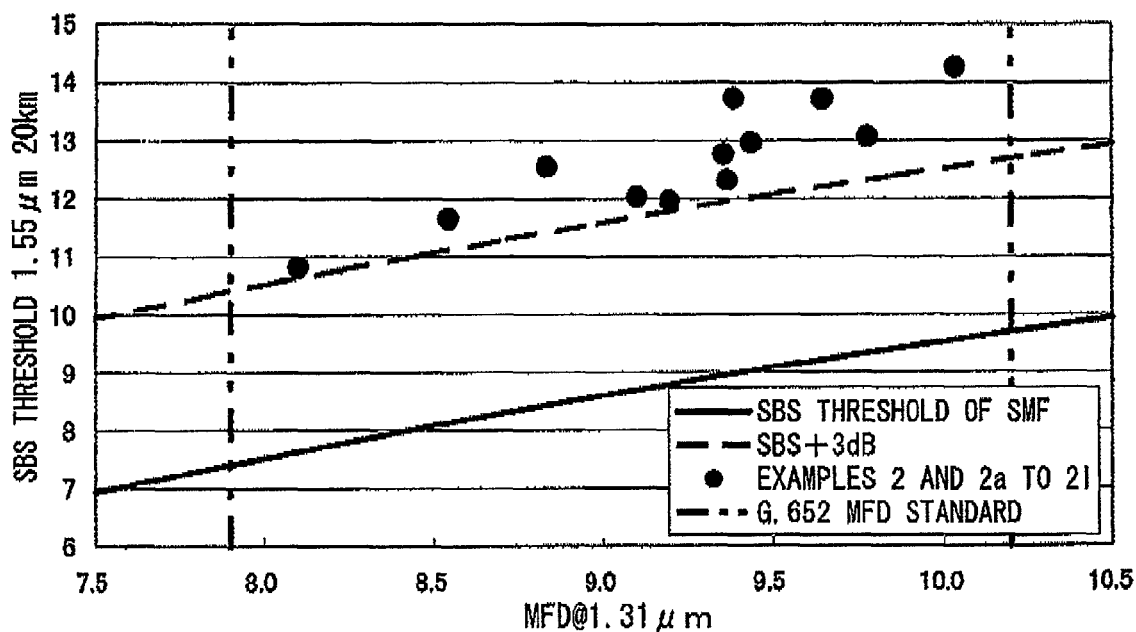
FIG. 21 is a view showing relationships between SBS thresholds and MFDs of Example 6.

Structural parameters of the optical fiber preform of Example 6 are represented in Tables 11 and 12 by using X, Y, and R2/R1 described above, and optical characteristics that were exhibited when the preform was drawn into an optical fiber are shown. The optical fiber drawn from the optical fiber preform of Example 6 had an SBS threshold of 10.8 to 14.3 dBm for a length of 20 km as shown in FIG. 21, and obtained a suppression effect higher than the SMF having the same MFD by +3.2 to +4.7 dB, so that the G652 standard was further satisfied.

TABLE 11

|  | Unit | Example 6a | Example 6b | Example 6c | Example 6d | Example 6e | Example 6f |
|---|---|---|---|---|---|---|---|
| R1 | μm | 1.51 | 1.39 | 1.43 | 1.31 | 1.11 | 1.33 |
| R2 | μm | 3.03 | 3.05 | 2.87 | 3.13 | 3.10 | 3.45 |
| R3 | μm | 4.60 | 4.49 | 4.36 | 4.49 | 4.25 | 4.83 |
| R2/R1 | — | 2.00 | 2.20 | 2.00 | 2.40 | 2.80 | 2.60 |
| Δ1 | % | 0.50 | 0.50 | 0.44 | 0.56 | 0.44 | 0.40 |
| Δ2 | % | 0.24 | 0.22 | 0.18 | 0.18 | 0.26 | 0.30 |
| Δ3 | % | 0.50 | 0.60 | 0.70 | 0.70 | 0.70 | 0.70 |
| Δ1 − Δ2 | % | 0.26 | 0.28 | 0.26 | 0.38 | 0.18 | 0.10 |
| Δ3 − Δ2 | % | 0.26 | 0.38 | 0.52 | 0.52 | 0.44 | 0.40 |
| Δ2 + Δ3 | % | 0.74 | 0.82 | 0.88 | 0.88 | 0.96 | 1.00 |
| Fiber cutoff wavelength | μm | 1.32 | 1.32 | 1.32 | 1.32 | 1.32 | 1.32 |
| Cable cutoff wavelength | μm | 1.24 | 1.24 | 1.24 | 1.24 | 1.24 | 1.24 |
| MFD(Petermann II) at 1.31 μm | μm | 9.2 | 9.36 | 9.44 | 9.39 | 9.37 | 9.1 |
| Zero-dispersion wavelength | nm | 1317.9 | 1314.9 | 1314.2 | 1322.6 | 1309.5 | 1308.1 |
| Zero-dispersion slope | ps/nm$^2$-km | 0.0906 | 0.0905 | 0.0902 | 0.0914 | 0.0897 | 0.0898 |
| 20 mm diameter bending loss at 1.31 μm | dB/m | 0.39 | 0.69 | 1.42 | 1.35 | 0.92 | 0.15 |
| SBS threshold at 1.55 μm 20 km | dBm | 12.0 | 12.8 | 13.0 | 13.7 | 12.3 | 12.0 |

TABLE 12

|  | Unit | Example 6g | Example 6h | Example 6i | Example 6j | Example 6k | Example 6l | Example 6m |
|---|---|---|---|---|---|---|---|---|
| R1 | μm | 1.56 | 1.51 | 1.68 | 1.58 | 1.81 | 1.35 | 1.41 |
| R2 | μm | 3.13 | 3.33 | 3.69 | 4.10 | 3.62 | 2.97 | 2.82 |
| R3 | μm | 4.76 | 4.91 | 5.43 | 5.74 | 5.51 | 4.37 | 4.28 |
| R2/R1 | — | 2.0 | 2.2 | 2.2 | 2.6 | 2.0 | 2.2 | 2.0 |
| Δ1 | % | 0.56 | 0.56 | 0.50 | 0.50 | 0.44 | 0.50 | 0.44 |
| Δ2 | % | 0.24 | 0.22 | 0.15 | 0.18 | 0.18 | 0.35 | 0.20 |
| Δ3 | % | 0.70 | 0.70 | 0.70 | 0.55 | 0.55 | 0.80 | 0.70 |
| Δ1 − Δ2 | % | 0.32 | 0.34 | 0.35 | 0.32 | 0.26 | 0.15 | 0.24 |
| Δ3 − Δ2 | % | 0.46 | 0.48 | 0.55 | 0.37 | 0.37 | 0.45 | 0.50 |
| Δ3 + Δ2 | % | 0.94 | 0.92 | 0.85 | 0.73 | 0.73 | 1.15 | 0.90 |
| Fiber cutoff wavelength | μm | 1.32 | 1.32 | 1.32 | 1.32 | 1.32 | 1.32 | 1.32 |
| Cable cutoff wavelength | μm | 1.24 | 1.24 | 1.24 | 1.24 | 1.24 | 1.24 | 1.24 |
| MFD(Petermann II) at 1.31 μm | μm | 8.54 | 8.83 | 9.64 | 10.03 | 9.77 | 8.1 | 9.2 |
| Zero-dispersion wavelength | nm | 1322.4 | 1321.7 | 1317.1 | 1315.6 | 1310.9 | 1317 | 1314 |
| Zero-dispersion slope | ps/nm$^2$-km | 0.088 | 0.090 | 0.093 | 0.093 | 0.092 | 0.087 | 0.090 |
| 20 mm diameter bending loss at 1.31 μm | dB/m | 0.01 | 0.05 | 0.40 | 1.36 | 0.64 | 0.00 | 0.18 |
| SBS threshold at 1.55 μm 20 km | dBm | 11.7 | 12.6 | 13.7 | 14.3 | 13.1 | 10.8 | 12.6 |

Example 7

Figure 22:
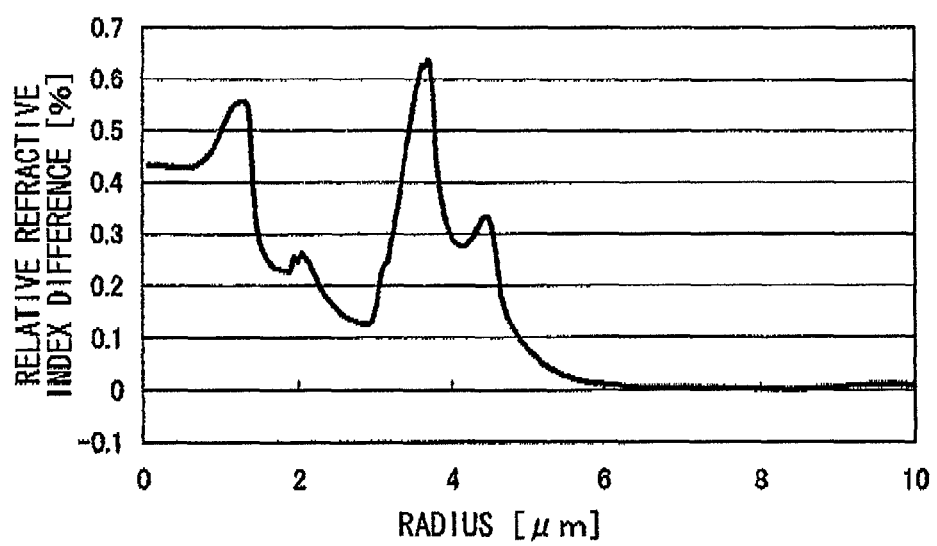
FIG. 22 is a view showing a refractive index profile of an optical fiber preform of Example 7.

FIG. 22 shows a refractive index profile of an optical fiber preform of Example 7. The optical fiber preform in this example, as shown in FIG. 22, is constituted by: a three-layer structured core which includes, a first core disposed in a region from the center of the core to a radius of R1, a second core which surrounds and comes in contact with the first core and is disposed in a region from the radius of R1 μm to a radius of R2 μm, and a third core which surrounds and comes in contact with the second core and is disposed in a region from the radius of R2 μm to a radius of R3 μm. Like Examples 1, 2, 5, and 6, the three-layer structured core is included. However, unlike in Examples 1, 2, 5, and 6, the refractive index profile smoothly changes, and the definition of the boundary thereof is the same as in Examples 3 and 4.

Structural parameters of the optical fiber preform of Example 7 are represented in Table 13, and optical characteristics that were exhibit when the preform was drawn into an optical fiber are shown. The optical fiber drawn from the optical fiber preform of Example 7 had an SBS threshold of 12.6 dBm for a length of 20 km and obtained a suppression effect higher than the SMF having the same MFD by +3.8 dB, and the G652 standard was satisfied.

TABLE 13

| | Unit | Example 7 |
|---|---|---|
| R1 | μm | 1.41 |
| R2 | μm | 3.03 |
| R3 | μm | 4.60 |
| R2/R1 | — | 2.1 |
| Δ1 | % | 0.49 |
| Δ2 | % | 0.13 |
| Δ3 | % | 0.64 |
| Δ1 − Δ2 | % | 0.36 |
| Δ3 − Δ2 | % | 0.51 |
| Δ3 + Δ2 | % | 0.76 |
| Fiber cutoff wavelength | μm | 1.32 |
| Cable cutoff wavelength | μm | 1.24 |
| MFD(Petermann II) at 1.31 μm | μm | 9.39 |
| Zero-dispersion wavelength | nm | 1319.6 |
| Zero-dispersion slope | ps/nm$^2$·km | 0.090 |
| 20 mm diameter bending loss at 1.31 μm | dB/m | 0.21 |
| SBS threshold at 1.55 μm 20 km | dBm | 12.6 |

INDUSTRIAL APPLICABILITY

According to the invention, for the optical fiber having a segment-core type refractive index profile, the relationships between the relative refractive index differences Δ1, Δ2, and Δ3 of the layers are suitably designed, and the position of the third core is suitably determined. Therefore, it is possible to increase an SBS threshold by +3 dB or higher as compared with the SMF having the same MFD while maintaining the optical characteristics described in G652.

In addition, by allowing the relative refractive index difference of the third core to be greater than that of the first core, it is possible to improve manufacturability of the optical fiber preform.

The invention claimed is:

1. An optical fiber having a refractive index profile constituted by:

a three-layer structured core which includes, in the central portion of the core, a first core having a substantially uniform positive relative refractive index difference Δ1 in a region from the center of the core to a radius of R1 μm, a second core which surrounds and comes in contact with the first core and has a substantially uniform positive relative refractive index difference Δ2 in a region from the radius of R1 μm to a radius of R2 μm, and a third core which surrounds and comes in contact with the second core and has a substantially uniform positive relative refractive index difference Δ3 in a region from the radius of R2 μm to a radius of R3 μm; and a cladding which surrounds and comes in contact with the three-layer structured core and has a substantially uniform refractive index, wherein Δ2 is equal to or less than 0.4%, Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, and X and Y satisfy 0.25%<X<0.6%, 0.1%≦Y≦0.6%, and a relationship of (2*X−0.7)%<Y<(X/2+0.4)%, Δ2, Δ3, R1, and R2 satisfy relationships of (Δ2+Δ3)+1.0≦R2/R1≦7*(Δ2+Δ3)−1.45 and Δ2+Δ3≦1.15, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm$^2$·km), a uniform bending loss is equal to or less than 2 dB/m at a diameter of 20 mm and a wavelength of 1.31 μm, and an SBS threshold at a wavelength of 1.55 μm is higher than that of a single-mode optical fiber having a typical step-index profile and the same mode field diameter by +3 dB or higher.

2. An optical fiber having a refractive index profile constituted by:

a three-layer structured core which includes, in the central portion of the core, a first core having a maximum relative refractive index difference Δ1 in a region from the center of the core to a radius of R1 μm, a second core which surrounds and comes in contact with the first core and has a minimum relative refractive index difference Δ2 in a region from the radius of R1 μm to a radius of R2 μm, and a third core which surrounds and comes in contact with the second core and has a maximum relative refractive index difference Δ3 in a region from the radius of R2 μm to a radius of R3 μm; and a cladding which surrounds and comes in contact with the tee-layer structured core and has a substantially uniform refractive index, wherein Δ2 is equal to or less than 0.4%, Δ1, Δ2, and Δ3 have relationships of Δ1>Δ2, Δ3>Δ2, and Δ3>Δ1, when Δ1, Δ2, and Δ3 have relationships of Δ1−Δ2=X and Δ3−Δ2=Y, (X+Y)>0.4% is satisfied, X and Y satisfy 0.25%<X<0.6%, 0.1%≦Y≦0.6%, and a relationship of (2*X−0.7)%<Y<(X/2+0.4)%, Δ2, Δ3, R1, and R2 satisfy relationships of (Δ2+Δ3)+1.0≦R2/R1≦7*(Δ2+Δ3)−1.45 and Δ2+Δ3≦1.15, a cable cutoff wavelength is less than 1260 nm, a mode field diameter is in the range of 7.9 to 10.2 μm at a wavelength of 1.31 μm, a zero-dispersion wavelength is in the range of 1300 to 1324 nm, a zero-dispersion slope is equal to or less than 0.093 ps/(nm$^2$·km), a uniform bending loss is equal to or less than 2 dB/m at a diameter of 20 mm and a wavelength of 1.31 µm, and an SBS threshold at a wavelength of 1.55 µm is higher than that of a single-mode optical fiber having a typical step-index profile and the same mode field diameter by +3 dB or higher.

3. An optical fiber preform having a refractive index profile constituted by:

a three-layer structured core which includes, in the central portion of the core, a first core having a substantially uniform positive relative refractive index difference $\Delta 1$ in a region from the center of the core to a radius of R1 µm, a second core which surrounds and comes in contact with the first core and has a substantially uniform positive relative refractive index difference $\Delta 2$ in a region from the radius of R1 µm to a radius of R2 µm, and a third core which surrounds and comes in contact with the second core and has a substantially uniform positive relative refractive index difference $\Delta 3$ in a region from the radius of R2 µm to a radius of R3 µm; and a cladding which surrounds and comes in contact with the three-layer structured core and has a substantially uniform refractive index, wherein $\Delta 2$ is equal to or less than 0.4%, $\Delta 1$, $\Delta 2$, and $\Delta 3$ have relationships of $\Delta 1 > \Delta 2$, $\Delta 3 > \Delta 2$, and $\Delta 3 > \Delta 1$, when $\Delta 1$, $\Delta 2$, and $\Delta 3$ have relationships of $\Delta 1 - \Delta 2 = X$ and $\Delta 3 - \Delta 2 = Y$, $(X+Y) > 0.4\%$ is satisfied, and X and Y satisfy $0.25\% < X < 0.6\%$, $0.1\% \leq Y \leq 0.6\%$, and a relationship of $(2*X-0.7)\% < Y < (X/2+0.4)\%$, $\Delta 2$, $\Delta 3$, R1, and R2 satisfy relationships of $(\Delta 2+\Delta 3)+1.0 \leq R2/R1 \leq 7*(\Delta 2+\Delta 3)-1.45$ and $\Delta 2+\Delta 3 \leq 1.15$, and when the optical fiber preform is drawn into an optical fiber, a cable cutoff wavelength is less than 1260 nm, a mode field diameter is in the range of 7.9 to 10.2 µm at a wavelength of 1.31 µm, a zero-dispersion wavelength is in the range of 1300 to 1324 nm, a zero-dispersion slope is equal to or less than 0.093 ps/(nm$^2$·km), a uniform bending loss is equal to or less than 2 dB/m at a diameter of 20 mm and a wavelength of 1.31 µm, and an SBS threshold at a wavelength of 1.55 µm is higher than that of a single-mode optical fiber having a typical step-index profile and the same mode field diameter by +3 dB or higher.

4. An optical fiber preform having a refractive index profile constituted by:

a three-layer structured core which includes, in the central portion of the core, a first core having a maximum relative refractive index difference $\Delta 1$ in a region from the center of the core to a radius of R1 µm, a second core which surrounds and comes in contact with the first core and has a minimum relative refractive index difference $\Delta 2$ in a region from the radius of R1 µm to a radius of R2 µm, and a third core which surrounds and comes in contact with the second core and has a maximum relative refractive index difference $\Delta 3$ in a region from the radius of R2 µm to a radius of R3 µm; and a cladding which surrounds and comes in contact with the three-layer structured core and has a substantially uniform refractive index, wherein $\Delta 2$ is equal to or less than 0.4%, $\Delta 1$, $\Delta 2$, and $\Delta 3$ have relationships of $\Delta 1 > \Delta 2$, $\Delta 3 > \Delta 2$, and $\Delta 3 > \Delta 1$, when $\Delta 1$, $\Delta 2$, and $\Delta 3$ have relationships of $\Delta 1 - \Delta 2 = X$ and $\Delta 3 - \Delta 2 = Y$, $(X+Y) > 0.4\%$ is satisfied, and X and Y satisfy $0.25\% < X < 0.6\%$, $0.1\% \leq Y \leq 0.6\%$, and a relationship of $(2*X-0.7)\% < Y < (X/2+0.4)\%$, $\Delta 2$, $\Delta 3$, R1, and R2 satisfy relationships of $(\Delta 2+\Delta 3)+1.0 \leq R2/R1 \leq 7*(\Delta 2+\Delta 3)-1.45$ and $\Delta 2+\Delta 3 \leq 1.15$, and when the optical fiber preform is drawn into an optical fiber, a cable cutoff wavelength is less than 1260 nm, a mode field diameter is in the range of 7.9 to 10.2 µm at a wavelength of 1.31 µm, a zero-dispersion wavelength is in the range of 1300 to 1324 nm, a zero-dispersion slope is equal to or less than 0.093 ps/(nm$^2$·km), a uniform bending loss is equal to or less than 2 dB/m at a diameter of 20 mm and a wavelength of 1.31 µm, and an SBS threshold at a wavelength of 1.55 µm is higher than that of a single-mode optical fiber having a typical step-index profile and the same mode field diameter by +3 dB or higher.

* * * * *